United States Patent
Carranza et al.

(10) Patent No.: US 11,214,753 B2
(45) Date of Patent: Jan. 4, 2022

(54) SILICONE FUNCTIONALIZED VISCOSITY INDEX IMPROVER

(71) Applicant: Afton Chemical Corporation, Richmond, VA (US)

(72) Inventors: Arturo Carranza, Glen Allen, VA (US); Kongsheng Yang, Glen Allen, VA (US); Ashutosh Gupta, Henrico, VA (US); Sheng Jiang, Glen Allen, VA (US)

(73) Assignee: Afton Chemical Corporation, Richmond, VA (US)

( * ) Notice: Subject to any disclaimer, the term of this patent is extended or adjusted under 35 U.S.C. 154(b) by 0 days.

(21) Appl. No.: 16/733,811

(22) Filed: Jan. 3, 2020

(65) Prior Publication Data
US 2021/0207052 A1 Jul. 8, 2021

(51) Int. Cl.
| | |
|---|---|
| *C10M 169/04* | (2006.01) |
| *C10M 155/02* | (2006.01) |
| *C08G 77/442* | (2006.01) |
| *C10N 40/04* | (2006.01) |
| *C10N 40/00* | (2006.01) |
| *C10N 20/04* | (2006.01) |
| *C10N 40/08* | (2006.01) |
| *C10N 40/10* | (2006.01) |
| *C10N 40/30* | (2006.01) |

(52) U.S. Cl.
CPC ......... *C10M 155/02* (2013.01); *C08G 77/442* (2013.01); *C10M 169/041* (2013.01); *C10M 2203/003* (2013.01); *C10M 2229/052* (2013.01); *C10N 2020/04* (2013.01); *C10N 2040/042* (2020.05); *C10N 2040/044* (2020.05); *C10N 2040/045* (2020.05); *C10N 2040/08* (2013.01); *C10N 2040/10* (2013.01); *C10N 2040/135* (2020.05); *C10N 2040/30* (2013.01)

(58) Field of Classification Search
CPC ............ C10M 155/02; C10M 169/041; C10M 2229/052; C10M 2203/003; C08G 77/442; C10N 2040/135; C10N 2040/045; C10N 2040/042; C10N 2040/08; C10N 2040/30; C10N 2020/04; C10N 2040/10; C10N 2040/044
USPC ....................................................... 508/204
See application file for complete search history.

(56) References Cited

U.S. PATENT DOCUMENTS

| | | |
|---|---|---|
| 2,237,625 A | 4/1941 | Olin |
| 2,237,627 A | 4/1941 | Olin |
| 2,527,948 A | 10/1950 | Lyon et al. |
| 2,695,316 A | 11/1954 | McBride |
| 2,995,569 A | 8/1961 | Hamilton et al. |
| 3,022,351 A | 2/1962 | Mihm et al. |
| 3,087,936 A | 4/1963 | Le Suer |
| 3,163,603 A | 12/1964 | Le Suer |
| 3,219,666 A | 11/1965 | Normal et al. |
| 3,308,166 A | 3/1967 | Michel et al. |
| 3,392,201 A | 7/1968 | Warner |
| 3,471,404 A | 10/1969 | Myers |
| 3,565,804 A | 2/1971 | Honnen et al. |
| 3,634,515 A | 1/1972 | Piasek et al. |
| 3,673,090 A | 6/1972 | Waldbillig et al. |
| 3,697,574 A | 10/1972 | Piasek et al. |
| 3,703,504 A | 11/1972 | Horodysky |
| 3,703,505 A | 11/1972 | Horodysky et al. |
| 3,736,357 A | 5/1973 | Piasek et al. |
| 3,796,661 A | 3/1974 | Suratwala et al. |
| 3,873,454 A | 3/1975 | Horodysky et al. |
| 4,119,549 A | 10/1978 | Davis |
| 4,119,550 A | 10/1978 | Davis et al. |
| 4,147,640 A | 4/1979 | Jayne et al. |
| 4,160,739 A | 7/1979 | Stambaugh |
| 4,191,659 A | 3/1980 | Davis |
| 4,204,969 A | 5/1980 | Papay et al. |
| 4,218,332 A | 8/1980 | Schwab et al. |
| 4,234,435 A | 11/1980 | Meinhardt et al. |
| 4,240,958 A | 12/1980 | Braid |
| 4,259,194 A | 3/1981 | DeVries et al. |
| 4,259,195 A | 3/1981 | King et al. |
| 4,261,843 A | 4/1981 | King et al. |
| 4,263,152 A | 4/1981 | King et al. |
| 4,265,773 A | 5/1981 | DeVries et al. |
| 4,272,387 A | 6/1981 | King et al. |

(Continued)

FOREIGN PATENT DOCUMENTS

| | | |
|---|---|---|
| EP | 0612839 | 8/1994 |
| EP | 3196278 A1 | 7/2017 |

(Continued)

OTHER PUBLICATIONS

International Search Report and Written Opinion for corresponding International Application No. PCT/US2020/062750 dated Mar. 26, 2021, 10 pages.

(Continued)

*Primary Examiner* — Prem C Singh
*Assistant Examiner* — Francis C Campanell
(74) *Attorney, Agent, or Firm* — Honigman LLP

(57) ABSTRACT

A multi-functional olefin copolymer viscosity index improver and a lubricating oil composition including such lubricant additive that provides improved viscometric properties and helps reduce low speed pre-ignition events at the same time. In one approach, the multi-functional olefin copolymer viscosity index improver is silicone functionalized and includes an acylated olefin copolymer with aminosilane or aminosiloxone pendant or side groups.

20 Claims, No Drawings

(56) References Cited

U.S. PATENT DOCUMENTS

| | | |
|---|---|---|
| 4,283,295 A | 8/1981 | DeVries et al. |
| 4,285,822 A | 8/1981 | deVries et al. |
| 4,340,689 A | 7/1982 | Joffrion |
| 4,343,917 A | 8/1982 | Keogh |
| 4,344,854 A | 8/1982 | Davis et al. |
| 4,472,306 A | 9/1984 | Powers, III et al. |
| 4,564,709 A | 1/1986 | Koyama et al. |
| 4,636,322 A | 1/1987 | Nalesnik |
| 4,670,515 A | 6/1987 | Olivier |
| 4,711,736 A | 12/1987 | Horodysky et al. |
| 4,795,576 A | 1/1989 | Born et al. |
| 4,882,384 A * | 11/1989 | Willis .................. C08F 8/42 525/105 |
| 4,948,842 A | 8/1990 | Olivier |
| 4,954,274 A | 9/1990 | Zaweski et al. |
| 4,966,720 A | 10/1990 | DeGonia et al. |
| 5,075,383 A | 12/1991 | Migdal et al. |
| 5,204,012 A | 4/1993 | Schaffhausen |
| 5,229,022 A | 7/1993 | Won et al. |
| 5,241,003 A | 8/1993 | DeGonia et al. |
| 5,266,223 A | 11/1993 | Song et al. |
| 5,627,259 A | 5/1997 | Thaler et al. |
| 5,633,326 A | 5/1997 | Patil et al. |
| 5,643,859 A | 7/1997 | Gutierrez et al. |
| 5,650,381 A | 7/1997 | Gatto et al. |
| 5,792,729 A | 8/1998 | Harrison et al. |
| 5,851,965 A | 12/1998 | Harrison et al. |
| 5,853,434 A | 12/1998 | Harrison et al. |
| 5,883,057 A | 3/1999 | Roell et al. |
| 5,936,041 A | 8/1999 | Diana et al. |
| 6,034,040 A | 3/2000 | Ozbalik et al. |
| RE37,363 E | 9/2001 | Gatto et al. |
| 6,723,685 B2 | 4/2004 | Hartley et al. |
| RE38,929 E | 1/2006 | Gatto et al. |
| RE40,595 E | 12/2008 | Gatto et al. |
| 7,732,390 B2 | 6/2010 | Kadkhodayan et al. |
| 2007/0213241 A1* | 9/2007 | St. Clair .............. C10M 143/12 508/591 |
| 2012/0101017 A1 | 4/2012 | Duggal |
| 2013/0172220 A1* | 7/2013 | Ruhe, Jr. .............. C10M 133/56 508/238 |
| 2018/0201860 A1 | 7/2018 | Ransom |
| 2019/0048282 A1 | 2/2019 | Gieselman |

FOREIGN PATENT DOCUMENTS

| | | |
|---|---|---|
| GB | 1162334 A | 8/1969 |
| JP | S59184272 A | 10/1984 |
| WO | 9406897 A1 | 3/1994 |

OTHER PUBLICATIONS

Database WPI, Week 198448, Thomson Scientific, London, GB; AN 1984-297458 & JP S59 184272 A (Nippon Telegraph & Telephone Corp) (Oct. 19, 1984).

* cited by examiner

SILICONE FUNCTIONALIZED VISCOSITY INDEX IMPROVER

TECHNICAL FIELD

This disclosure relates to a multi-functional olefin copolymer viscosity index improver and a lubricating oil composition including such viscosity index improver, and in particular, a silicone functionalized, multi-functional olefin copolymer viscosity index improver and a lubricating oil composition including the silicone functionalized multi-functional olefin copolymer to provide one or more improved viscometric parameters and improvement in low speed pre-ignition events.

BACKGROUND

Viscosity index improvers are one component of lubricating oil compositions that help allow finished oil to meet SAE multi-grade viscosity standards. For instance, mineral or synthetic oil lubricants, such as driveline fluids, engine oils, or automatic transmission fluid to suggest a few examples, do not necessarily function the same over wide temperature variations. Such lubricants may become less effective at high temperatures because heat reduces their viscosity and film-forming ability. Alternatively, lubricants can also become less effective at cold temperatures as the viscosity of the lubricant increases. This problem is common to many oil lubricants and can be characterized in terms of "viscosity index" (VI), which is an arbitrary measure for the change of viscosity of a lubricating oil with variations in temperature. The lower the VI, the greater the change in viscosity of the oil with temperature changes and vice versa. The viscosity of a lubricant is closely related to its ability to reduce friction. Generally, the least viscous lubricant which still forces two moving surfaces apart is desired. If the lubricant is too viscous, it will require a large amount of energy to move the surfaces; if it is too thin, the surfaces will come in contact and friction will increase. Many lubricant applications, such as lubrication for engine oils, driveline fluids, or automatic transmission fluids, require the lubricant to perform consistently across a wide range of temperatures. However, many lubricants do not inherently have a high enough VI to remain consistent across the wide range of temperatures required by an automobile.

In an attempt to address this shortcoming, a viscosity index improver ("VII") can be added to the lubricant. Viscosity index improvers are commonly polymers, and are added to reduce lubricant viscosity changes at high and low temperatures. When viscosity index improvers are added to low-viscosity oils, they effectively thicken the oil as temperature increases. This means the lubricating effect of mineral oils can be extended across a wider temperature range.

However, various additives in lubricants may also have unintended effects on performance. In some instances, for example, various additives in lubricants may contribute to an undesired phenomenon typically characterized as low-speed pre-ignition (or LSPI), which is believed to be a form of combustion that results with ignition of the air-fuel mixture in the combustion chamber prior to the desired ignition. Often, turbocharged or supercharged engines, may be prone to LSPI, which is a pre-ignition event that may include high pressure spikes, early combustion, and/or knock. All of these, individually and in combination, are undesired. However, because LSPI events occur only sporadically and in an uncontrolled fashion, it is difficult to identify the causes for this phenomenon and to develop solutions to suppress it. This abnormal combustion at low-speeds and medium-to-high loads, for example, during operation of the engine at 3,000 rpm or less, under load, with a brake mean effective pressure (BMEP) of at least 10, bar is when most LSPI events are often observed. LSPI events are undesired and prior solutions are less than satisfactory.

SUMMARY

In one approach or embodiment, a multi-functional olefin copolymer viscosity index improver is described in this disclosure. In one approach, the copolymer includes an acylated olefin copolymer with aminosilane pendant groups, and wherein the acylated olefin copolymer includes an olefin copolymer backbone with grafted acylating moieties thereon linking the aminosilane pendant groups to the olefin copolymer backbone.

In other approaches or embodiments, the copolymer of the previous paragraph may be combined with optional features in any combination thereof. These optional features include one or more of the following: wherein the aminosilane pendant groups are derived from aminoalkyl silanes, aminoalkyl siloxanes, aminoalkyl polysiloxanes, aminoaryl silanes, aminoaryl siloxanes, aminoarl oxy silanes, and combinations thereof, and/or wherein the multi-functional olefin copolymer viscosity index improver is the reaction product of the acylated olefin copolymer and the aminosilane selected from aminoalkyl silanes, aminoalkyl silixones, aminoalkyl polysiloxanes, aminoaryl silanes, aminoaryl siloxanes, aminoarl oxy silanes, and combinations thereof; and/or wherein the reaction product is further reacted with an amine selected from alkylamines, alkylpolyamines, or combinations thereof, and/or wherein the grafted acylating moieties are grafted dicarboxylic moieties; and/or wherein the olefin copolymer backbone has a number average molecular weight of about 10,000 to about 200,000; and/or wherein the olefin copolymer backbone is derived from a copolymer of ethylene and one or more C3 to C18 α-olefins; and/or wherein the acylated olefin copolymer has about 0.1 to about 0.8 carboxylic groups per 1,000 number average molecular weight units of the acylated olefin copolymer; and/or wherein the acylated olefin copolymer is derived from a copolymer of ethylene and one or more C3 to C18 α-olefins and a grafted ethylenically unsaturated acylating agent having at least one ethylenic bond and at least one carboxylic acid group or anhydride group thereof or a polar group that is convertible into a carboxyl group reacted with the olefin copolymer and wherein the acylated olefin copolymer includes about 15 to about 80 mol % ethylene and about 85 to about 20 mol % C3 to C18 α-olefins; and/or wherein the ethylenically unsaturated acylating agent is selected from acrylic acid, methacrylate acid, cinnamic acid, crotonic acid, maleic acid, fumaric acid or anhydride derivatives thereof.

In yet other approaches or embodiments, a lubricating oil composition comprising a major amount of a base oil and a minor amount of an acylated olefin copolymer viscosity index improver having aminosilane pendant groups is described herein. In approaches, the acylated olefin copolymer has an olefin copolymer backbone with grafted acyl moieties thereon linking the aminosilane pendant group to the olefin copolymer backbone, and the acylated olefin copolymer viscosity index improver is provided in an amount to provide about 5 to about 200 ppm of silicone to the lubricating oil composition.

In other approaches or embodiments, the lubricant of the previous paragraph may be combined with optional features in any combination thereof. These optional features include one or more of the following: wherein the aminosilane pendant groups are derived from aminoalkyl silanes, aminoalkyl silixones, aminoalkyl polysiloxanes, aminoaryl silanes, aminoaryl siloxanes, aminoarl oxy silanes, and combinations thereof; and/or wherein the multi-functional olefin copolymer viscosity index improver is the reaction product of the acylated olefin copolymer and the aminosilane selected from aminoalkyl silanes, aminoalkyl silixones, aminoalkyl polysiloxanes, aminoaryl silanes, aminoaryl siloxanes, aminoarl oxy silanes, and combinations thereof; and/or wherein the reaction product is further reacted with an amine selected from alkylamines, alkylpolyamines, or combinations thereof, and/or wherein the grafted acyl moieties are grafted dicarboxylic moieties; and/or wherein the olefin copolymer backbone has a number average molecular weight of about 10,000 to about 200,000; and/or wherein the olefin copolymer backbone is derived from a copolymer of ethylene and one or more C3 to C18 α-olefins; and/or wherein the acylated olefin copolymer has about 0.1 to about 0.8 carboxylic group per 1,000 number average molecular weight units of the acylated olefin copolymer; and/or wherein the acylated olefin copolymer is derived from a copolymer of ethylene and one or more C3 to C18 α-olefins and a grafted ethylenically unsaturated acylating agent material having at least one ethylenic bond and at least one carboxylic acid group or anhydride group thereof or a polar group that is convertible into a carboxyl group reacted with the olefin copolymer; and/or wherein the ethylenically unsaturated acylating agent material is selected from acrylic acid, methacrylate acid, cinnamic acid, crotonic acid, maleic acid, fumaric acid or anhydride derivatives thereof.

In yet further approaches or embodiments, the copolymer of any of the preceding paragraphs is described herein for use of lubricating compositions for reducing low speed pre-ignition events and providing improved Viscometric properties as described in this disclosure.

DETAILED DESCRIPTION

In one aspect, this disclosure describes a multi-functional olefin copolymer viscosity index improver and a lubricating oil composition including such lubricant additive that provides not only improved viscometric properties, but also helps reduce low speed pre-ignition events at the same time. In one approach, the multi-functional olefin copolymer viscosity index improver is silicone functionalized and includes an acylated olefin copolymer with aminosilane or aminosiloxone pendant or side groups. The acylated olefin copolymer is a copolymer having an olefin copolymer backbone with grafted acylating moieties thereon that link the aminosilane pendant groups to the olefin copolymer backbone. In some approaches, the aminosilane or aminosiloxone pendant groups may be derived from aminoalkyl silanes, aminoalkyl siloxanes, aminoalkyl polysiloxanes, aminoaryl silanes, aminoaryl siloxanes, aminoarl oxy silanes, and the like, derivatives thereof, and combinations thereof. As used herein, a silane generally refers to a silicone atom with four substituents thereon. In yet other approaches, the multi-functional olefin copolymer viscosity index improver is the reaction product of the acylated olefin copolymer and the selected amino silane compound. In some optional approaches, the multi-functional olefin copolymer viscosity index improver, in addition to being functionalized with silicone, may be further functionalized or post treated with an amine or polyamine selected from alkylamines, alkylpolyamines, or combinations thereof.

Acylated Olefin Copolymer

The acylated olefin copolymer forms the copolymer backbone of the multi-functional viscosity index improver. In one approach, the acylated olefin copolymer is the reaction product of one or more olefin copolymers and one or more grafted acylating agents. Grafting acylating moieties on to the olefin copolymer may be performed using any technique known in the art. Scheme 1 below provides an exemplary reaction for this grafting reaction using ethylene and propylene as exemplary monomers in the polymer and maleic anhydride as the acylating moiety (however, any of the reactants herein may also be used in a similar reaction scheme):

(Scheme 1)

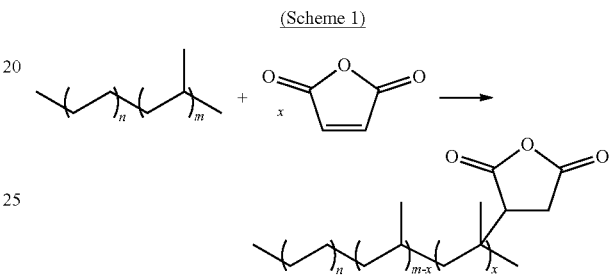

In some aspects, the olefin copolymer backbone may have a copolymer backbone of ethylene and an alkylene having 3 to 18 carbon atoms, for example, 3 to 5, 3 to 10, 3 to 15, 5 to 10, 8 to 12, 10 to 15, or 10 to 18 carbon atoms. In some approaches, the alkylene may be propylene, butylene, isobutylene, n-pentylene, pentylene, neopentylene, and any mixture thereof.

In other approaches, the polymers are copolymers of ethylene and one or more C3 to C18 α-olefin. In some aspects, copolymers of ethylene and propylene are used as the olefin copolymer. Additional α-olefins that may be used in place of ethylene and/or propylene to form the olefin copolymer or can be used in combination with ethylene and propylene to form a terpolymer may include, for example, but is not limited to: 1-butene, 1-pentene, 4-methyl-1-pentene, 1-hexene, 1-octene, 1-decene, 1-dodecene, 1-tetradecene, 1-hexadecene, 1-octadecene, 1-eicosene, styrene, or any combination thereof.

In still other approaches, more complex olefin copolymers, often designated as interpolymers, may be prepared using a third or multi-functional component/monomer. This third monomer can be generally used to prepare an interpolymer substrate using a polyene monomer selected from non-conjugated dienes and trienes. In some aspects, α,ω-diolefins may be incorporated into the olefin copolymer to provide alternate polymer morphologies where the α,ω-diolefin may include, for example, 1,5-hexadiene, 1,6-heptadiene, 1,7-octadiene, branched chain α-olefins such as 4-methylbutene-1,5-methylpentene-1 and 6-methylbeptene-1, and any mixture thereof. In some aspects, the non-conjugated diene component may have from 5 to 14 carbon atoms in the chain. In some aspects, the diene monomer is characterized by the presence of a vinyl group in its structure and can include cyclic and bicyclo compounds. Representative dienes include 1,4-hexadiene, 1,4-cyclohexadiene, dicyclopentadiene, 5-ethylidene-2-norbornene, 5-methylene-2-norborene, 1,5-heptadiene, and 1,6-octadiene. A mixture of more than one diene can be used in the preparation of the interpolymer. In some aspects, the non-conjugated diene for preparing a terpolymer or interpolymer substrate is 1,4-hexadiene. The triene component will have at least two non-conjugated double bonds, and up to about 30 carbon atoms in the chain. Typical trienes useful in preparing the interpolymer of this disclosure are 1-isopropylidene-3a,4,7,7a-tetrahydroindene, 1-isopropylidene dicyclopentadiene, dihydro-isodicyclopentadiene, and 2-(2-methylene-4-methyl-3-pentenyl) [2.2.1] bicyclo-5-heptene.

The olefin copolymer may include poly(ethylene-co-propylene) or poly(ethylene-co-higher $\alpha$-olefin) copolymers. These ethylene-co-$\alpha$-olefin copolymers may include from about 15 to 80 mole percent ethylene and from about 85 to 20 mole percent $C_3$ to $C_{18}$ $\alpha$-olefin, from about 35 to 75 mole percent ethylene and from about 65 to 25 mole percent of a $C_3$ to $C_{18}$ $\alpha$-olefin, from 50 to 70 mole percent ethylene and 50 to 30 mole percent $C_3$ to $C_{18}$ $\alpha$-olefin, and from 55 to 65 mole percent ethylene and 45 to 35 mole percent $C_3$ to $C_{18}$ $\alpha$-olefin.

Terpolymer variations of the foregoing polymers may contain from about 0.1 to 10 mole percent of a non-conjugated diene or triene. The terms polymer, copolymer, and terpolymer are used generically to encompass ethylene copolymers, terpolymers or interpolymers. In some aspects, these materials may contain minor amounts of other olefinic monomers so long as the basic characteristics of the ethylene copolymers are not materially changed.

The polymerization reaction used to form the ethylene-olefin copolymer substrate may be generally carried out in the presence of a conventional Ziegler-Natta or single site coordination polymerization catalyst system, such as a metallocene catalyst system. The polymerization medium is not specific and can include solution, slurry, or gas phase processes, as known to those skilled in the art. When solution polymerization is employed, the solvent may be any suitable inert hydrocarbon solvent that is liquid under reaction conditions for polymerization of $\alpha$-olefins; examples of satisfactory hydrocarbon solvents include straight chain paraffins having from 5 to 8 carbon atoms, with hexane being used in some aspects. Aromatic hydrocarbons, in some aspects aromatic hydrocarbon having a single benzene nucleus, such as benzene, toluene and the like; and saturated cyclic hydrocarbons having boiling point ranges approximating those of the straight chain paraffinic hydrocarbons and aromatic hydrocarbons described above, are particularly suitable. The solvent selected may be a mixture of one or more of the foregoing hydrocarbons. When slurry polymerization is employed, the liquid phase for polymerization is preferably liquid propylene. It is desirable that the polymerization medium be free of substances that will interfere with the catalyst components.

In some embodiments, the acylated olefin copolymer backbone is an oil soluble linear or branched polymer having a number average molecular weight of about 5,000 to about 200,000, or about 5,000 to about 150,000, from about 5,000 to about 100,000, from about 5,000 to about 50,000, from about 20,000 to about 150,000, from about 20,000 to about 100,000, from about 50,000 to about 150,000, or from about 50,000 to about 100,000.

The number average molecular weight (Mn) for any embodiment herein may be determined with a gel permeation chromatography (GPC) instrument obtained from Waters or the like instrument and the data processed with Waters Empower Software or the like software. The GPC instrument may be equipped with a Waters Separations Module and Waters Refractive Index detector (or the like optional equipment). The GPC operating conditions may include a guard column, 4 Agilent PLgel columns (length of 300×7.5 mm; particle size of 5µ, and pore size ranging from 100-10000 Å) with the column temperature at about 40° C. Un-stabilized HPLC grade tetrahydrofuran (THF) may be used as solvent, at a flow rate of 1.0 mL/min. The GPC instrument may be calibrated with commercially available polystyrene (PS) standards having a narrow molecular weight distribution ranging from 500-380,000 g/mol. The calibration curve can be extrapolated for samples having a mass less than 500 g/mol. Samples and PS standards can be in dissolved in THE and prepared at concentration of 0.1-0.5 weight percent and used without filtration. GPC measurements are also described in U.S. Pat. No. 5,266,223, which is incorporated herein by reference. The GPC method additionally provides molecular weight distribution information; see, for example, W. W. Yau, J. J. Kirkland and D. D. Bly, "Modern Size Exclusion Liquid Chromatography", John Wiley and Sons, New York, 1979, also incorporated herein by reference.

In some aspects, the acylating moieties or acyl groups grafted on to the olefin copolymer as side chains are obtained from ethylenically unsaturated carboxylic acid or anhydride reactants that include at least one carbon-carbon double bond and further comprise at least one carboxylic acid and/or dicarboxylic anhydride group. In some approaches, the reactants forming the acyl groups grafted on to the olefin copolymer backbone include, for example, acrylic acid, methacrylic acid, cinnamic acid, ferulic acid, ortho coumaric acid, meta coumaric acid, para coumaric acid, crotonic acid, maleic acid, maleic anhydride, fumaric acid, itaconic acid and itaconic anhydride, or any combination thereof. In other approaches, the reactants forming the acyl groups grafted on to the olefin copolymer backbone are selected from maleic acid, fumaric acid, maleic anhydride, or any combination thereof. In still other approaches, the reactants forming the acyl groups grafted on to the olefin copolymer backbone include maleic anhydride moieties.

In some aspects, the olefin copolymer backbone has grafted thereon from about 0.1 to about 0.8 maleic acid groups (or other acylating group) per 1000 number average molecular weight units of olefin copolymer, for example about 0.2 to about 0.75, about 0.5 to about 0.75, about 0.4 to about 0.5, or about 0.4 to about 0.8, or about 0.1 to about 0.4 acyl groups per 1000 number average molecular weight units of the olefin copolymer. In other aspects, the olefin copolymer has grafted thereon about 0.2, about 0.3, about 0.4, about 0.5, about 0.6 or about 0.75 maleic anhydride groups per 1000 number average molecular weight units of olefin copolymer. The examples herein provide further discussion on how the grafting value is calculated.

In other aspects, the acylation groups grafted on to the olefin copolymer backbone are grafted acylating moieties that can include grafted dicarboxylic moieties. The grafted dicarboxylic moieties can be present as a latent anhydride functional group, a reactive ester, an acid halide, or a carboxylic acid. The carboxylic moiety grafted onto the olefin copolymer backbone may be present in an amount to provide about 0.1 to about 0.8 carboxylic groups per 1000 number average molecular weight units of the polymer backbone, about 0.3 to about 0.75 carboxylic groups per 1000 number average molecular weight. For example, in some approaches, an olefin copolymer backbone with Mn of 20,000 is grafted with 6 to 15 carboxylic groups per polymer chain or 3 to 7.5 moles of maleic anhydride per mole of polymer. A copolymer with Mn of 100,000 is grafted with 30 to 75 carboxylic groups per polymer chain or 15 to 37.5 moles of maleic anhydride per polymer chain.

The grafting reaction to form the acylated olefin copolymer backbone is generally carried out with the aid of a free-radical initiator either in solution or in bulk, as in an extruder or intensive mixing device. When the polymerization is carried out in hexane solution, it is economically convenient to carry out the grafting reaction in hexane as described in U.S. Pat. Nos. 4,340,689; 4,670,515; and 4,948,842 which are each hereby incorporated herein by reference in their entirety. The resulting polymer intermediate is characterized by having carboxylic acid acylating functionality randomly within its structure.

In an exemplary bulk process for forming the acylated olefin copolymer backbone, the olefin copolymer backbone is fed to rubber or plastic processing equipment such as an extruder, intensive mixer or masticator, heated to a temperature of about 150° C. to about 400° C. and the ethylenically unsaturated carboxylic acid reagent and free-radical initiator are separately co-fed to the molten polymer to effect grafting. The reaction is carried out optionally with mixing conditions to effect shearing and grafting of the ethylene copolymers according to U.S. Pat. No. 5,075,383, which is hereby incorporated herein by reference in its entirely. The processing equipment is generally purged with nitrogen to prevent oxidation of the polymer and to aid in venting unreacted reagents and byproducts of the grafting reaction. The residence time in the processing equipment is sufficient to provide for the desired degree of acylation and to allow for purification of the acylated copolymer via venting. Mineral or synthetic lubricating oil may optionally be added to the processing equipment after the venting stage to dissolve the acylated copolymer.

The free-radical initiators which may be used to graft the ethylenically unsaturated carboxylic acid material to the polymer backbone include peroxides, hydroperoxides, peresters, and also azo compounds and preferably those which have a boiling point greater than about 100° C. and decompose thermally within the grafting temperature range to provide free radicals. Representatives of these free-radical initiators are azobutyronitrile, dicumyl peroxide, 2,5-dimethylhexane-2,5-bis-tertiarybutyl peroxide and 2,5-dimethylhex-3-yne-2,5-bis-tertiary-butyl peroxide. The free-radical initiator is used in an amount of between about 0.005% and about 1% by weight based on the weight of the reaction mixture.

Other methods known in the art for effecting reaction of ethylene-olefin copolymers with ethylenically unsaturated carboxylic reagents, such as halogenation reactions, thermal or "ene" reactions or mixtures thereof, can be used instead of the free-radical grafting process. Such reactions are conveniently carried out in mineral oil or bulk by heating the reactants at temperatures of about 250° C. to about 400° C. under an inert atmosphere to avoid the generation of free radicals and oxidation byproducts. "Ene" reactions are a preferred method of grafting when the ethylene-olefin copolymer contains unsaturation. To achieve the high graft levels, 0.3 to 0.5 carboxylic groups per 1000 Mn, desired by this disclosure, it may be necessary to follow or proceed the "ene" or thermal graft reaction with a free radical graft reaction.

Aminosilane Functionalization

The acylated olefin copolymer discussed in any of the above paragraphs is functionalized with a silicone containing compound to provide the aminosilane or aminosiloxane pendant or side groups. These pendant or side groups are linked to the olefin copolymer backbone through the grafted acylating moieties to provide an effective amount of silicone to the lubricant so that the additive not only provides desired viscometric performance but also help minimize low-speed pre-ignition events at the same time. In one aspect, the silicone is provided through the aminosilane pendant groups on the copolymer, and the aminosilane pendant groups may be derived from aminoalkyl silanes, aminoalkyl siloxanes, aminoalkyl polysiloxanes, aminoaryl silanes, aminoaryl siloxanes, aminoarl oxy silanes, derivatives thereof, and combinations thereof. In other aspects, the main copolymer or OCP backbone may be free of silicone atoms.

In one approach, the silicone functionalized multi-functional olefin copolymer is the reaction product of the acylated olefin copolymer discussed above and the aminosilane selected from aminoalkyl silanes, aminoalkyl silixones, aminoalkyl polysiloxanes, and combinations thereof. In another approach, the aminosilane may be derived from any polysiloxanes such as amino polydialkylsiloxanes polymers of Formula I below:

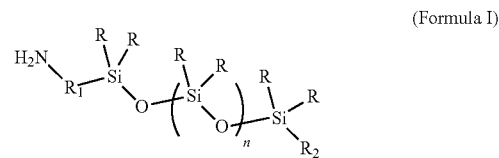

(Formula I)

wherein R is an alkyl group, such as a C1 to C6 alkyl group, and in some approaches, a methyl group; $R_1$ is an alkylene or hydrocarbyl linker such as a C1 to C10 hydrocarbyl group, and $R_2$ is an alkyl or hydrocarbyl group such as a C1 to C10 group, and n is an integer sufficient for the polymer to have a number average molecular weight of about 500 to about 2,000 g/mol, in other approaches, about 600 to about 1800, about 800 to about 1400, or about 800 to about 1200 g/mol.

In other approaches, the silicone functionalization may be provided through other aminosilane compounds such as polyalkyl-, polyaryl-, polyalkoxy-, or polyaryloxyl-silicone compounds such as 3-aminopropyltris(trimethylsiloxy)silane, 4-aminobutyltriethoxysilane, 4-amino-3,3-dimethylbutylmethyldimethoxysilane, 4-amino-3,3-dimethylbutyltrimethoxysilane, 1-amino-2-(dimethylethoxysilyl)propane, n-(2-aminoethyl)-3-aminoisobutyldimethylmethoxysilane, n-(2-aminoethyl)-3-aminoisobutylmethyldimethoxysilane, 1-[3-(2-aminoethyl)-3-aminoisobutyl]-1,1,3,3,3-pentaethoxy-1,3-disilapropane, (aminoethylaminomethyl)phenethyltrimethoxysilane, n-(2-aminoethyl)-3-aminopropylmethyldiethoxysilane, n-(2-aminoethyl)-3-aminopropylmethyldimethoxysilane, n-(2-aminoethyl)-3-aminopropyltriethoxysilane, n-(2-aminoethyl)-2,2,4-trimethyl-1-aza-2-silacyclopentane, 3-aminopropyldiisopropylethoxysilane, 3-aminopropylpentamethyldisiloxane, 11-aminoundecyltriethoxysilane and combinations thereof.

An exemplary aminosilane functionalization may follow the reaction scheme shown below:

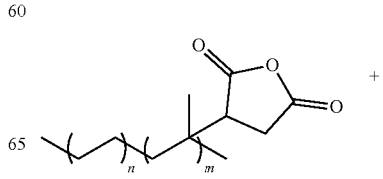

-continued

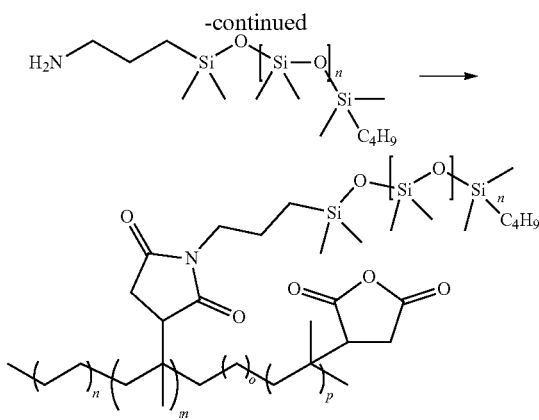

Any of the silicone compounds as discussed herein may be applied using this reaction scheme.

The multi-functional olefin copolymer viscosity index improver includes sufficient silicone so that lubricants including such additive have about 5 to about 200 ppm silicone or in other approaches, about 10 to about 180 ppm silicone. In yet other approaches, the copolymer provides a range of silicone in the lubricant ranging from at least about 5 ppm, at least about 10 ppm, at least about 20 ppm, at least about 50 ppm, or at least about 80 ppm to less than about 200 ppm, less than about 180 ppm, less than about 150 ppm, less than about 120 ppm, or less than about 100 ppm silicone to a lubricant. As mentioned previously, the silicon is provided in side or pendant chains of the olefin copolymer and the copolymer backbone is free of silicon. To this end, the multifunctional additive may have about 0.028 to about 0.52 weight percent silicone and may have a weight ratio of silicone to nitrogen of about 3.3 to about 32.7, and when optionally post treated as discussed more below, then a weight ratio of silicone to nitrogen of about 1.00 to about 27.55.

Post-Treatment

The silicone functionalized olefin copolymer viscosity index improver herein may also be optionally post-treated by conventional methods via a reaction with any of a variety of agents, which are known in the art. Among these are amino compounds, boron compounds, urea, thiourea, thiadiazoles and derivatives thereof, carbon disulfide, aldehydes, ketones, carboxylic acids, anhydrides, nitriles, epoxides, cyclic carbonates, zinc compounds, molybdenum compounds, and phosphorus compounds. See, for example, U.S. Pat. No. 5,241,003, which is incorporated herein by reference. Additional references that describe methods for preparing a boron containing and/or zinc containing lubricant additive are set forth in U.S. Pat. Nos. 3,163,603 and 3,087,936.

In one approach, the silicone functionalized olefin copolymer viscosity index improver is post treated with one or more amino compounds, such as linear or branched alkylamines or polyamines. In some approaches, the alkyl amines may be C1 to C20 linear or branched amino or polyamino compounds. Examples includes 2-ethyl-1-hexylamine, bis-2-ethyl-1-hexylamine, (3-Methylpentyl)amine, 6-Methyl-1-heptylamine, 1-Ethyl-N-pentylamine, 2-ethyl-N-butylamine, Dioctylamine, Didodecylamine, Didecylamine, tert-Octylamine, and 1-Ethylpropylamine.octadecyl amine, and eicosylamine and combinations thereof. When post treated with amino compounds, the olefin copolymer viscosity index improver may have about 0 to about 0.8 weight percent of the amino compound and the ratio of silicone to amine as discussed above. An exemplary reaction scheme of post treatment is shown below (any of the silicone compounds and/or amine compounds discussed herein may follow this reaction scheme).

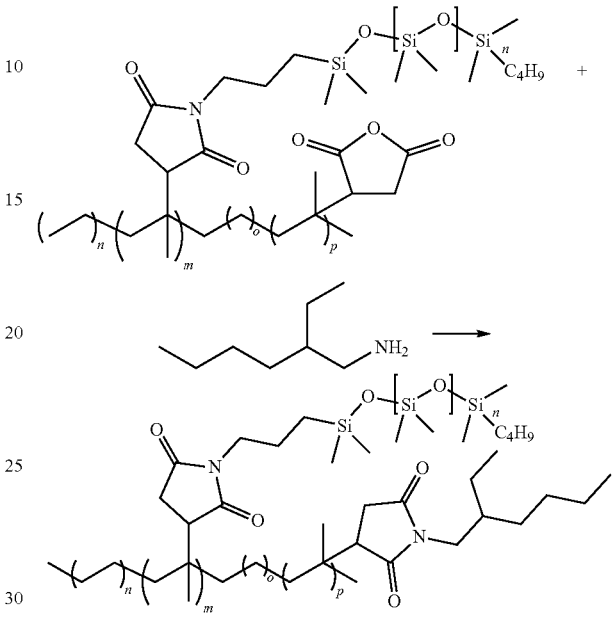

In other approaches and if post treated with boron, the boron compound used as a post-treating reagent can be selected from the group consisting of boron oxide, boron halides, boron acids and esters of boron acids in an amount to provide from about 0.1 atomic proportion of boron for each mole of the nitrogen composition to about 20 atomic proportions of boron for each atomic proportion of nitrogen used. The additive post-treated with boron may contain from about 0.05 to about 2.0 weight percent, or in other approaches, about 0.05 to about 0.7 weight percent boron, based on the total weight of the borated dispersant. In one embodiment the process of post-treating the additive comprises forming a succinimide product via the amine post treatment, as described above, and then further reacting the succinimide product with a boron compound, such as boric acid.

Carboxylic acid used as a post-treating reagent can be saturated or unsaturated mono-, di-, or poly-carboxylic acid. Examples of carboxylic acid include, but are not limited to, maleic acid, fumaric acid, succinic acid, and naphthalic diacid (e.g., 1,8-naphthalic diacid).

Anhydride used as a post-treating reagent can be selected from the group consisting of mono-unsaturated anhydride (e.g., maleic anhydride), alkyl or alkylene-substituted cyclic anhydrides (e.g., succinic anhydride or glutamic anhydride), and aromatic carboxylic anhydrides (including naphthalic anhydride, e.g., 1,8-naphthalic anhydride).

In some cases, the olefin copolymer viscosity index improver herein may be post-treated with more than one post-treatment agents. For example, the copolymer may be post-treated with the amine and then a boron compound, such as boric acid, and an anhydride, such as maleic anhydride and/or 1,8-naphthalic anhydride. The copolymer may also be post-treated with the amine, the boron compound, and then an anhydride, such as maleic anhydride. In yet other cases the copolymer may also be post treated with other conventional post-treatment reagents such as ethylene carbonate, dimercaptothiadiazoles, or molybdenum trioxide.

Lubricating Oil Compositions

The silicone functionalized olefin copolymer viscosity index improvers described herein may be blended to a major amount of a base oil in combination with one or more further additives to produce a lubricating oil composition that demonstrates improves viscometric performance and reduced low-speed pre-ignition events. The lubricating oil compositions herein may include about 0.1 weight percent to about 15 weight percent, or about 0.1 weight percent to about 10 weight percent, or about 3 weight percent to about 10 weight percent, or about 1 weight percent to about 6 weight percent, or about 7 weight percent to about 12 weight percent, of the silicone and optionally amine functionalized olefin copolymer viscosity index improver, based upon the weight of the lubricant composition.

Base Oil: The base oil or base oil of lubricating viscosity used in the lubricating oil compositions herein may be selected from any suitable base oil or blends of base oils. Examples include the base oils in Groups I-V as specified in the American Petroleum Institute (API) Base Oil Interchangeability Guidelines. These five base oil groups are as follows:

TABLE 1

| Base oil Category | Sulfur (%) | | Saturates (%) | Viscosity Index |
|---|---|---|---|---|
| Group I | >0.03 | and/or | <90 | 80 to 120 |
| Group II | ≤0.03 | and | ≥90 | 80 to 120 |
| Group III | ≤0.03 | and | ≥90 | ≥120 |
| Group IV | All polyalphaolefins (PAOs) | | | |
| Group V | All others not included in Groups I, II, III, or IV | | | |

Groups I, II, and III are mineral oil process stocks. Group IV base oils contain true synthetic molecular species, which are produced by polymerization of olefinically unsaturated hydrocarbons. Many Group V base oils are also true synthetic products and may include diesters, polyol esters, polyalkylene glycols, alkylated aromatics, polyphosphate esters, polyvinyl ethers, and/or polyphenyl ethers, and the like, but may also be naturally occurring oils, such as vegetable oils. It should be noted that although Group III base oils are derived from mineral oil, the rigorous processing that these fluids undergo causes their physical properties to be very similar to some true synthetics, such as PAOs. Therefore, oils derived from Group III base oils may be referred to as synthetic fluids in the industry.

The base oil used in the disclosed lubricating oil composition may be a mineral oil, animal oil, vegetable oil, synthetic oil, or mixtures thereof. Suitable oils may be derived from hydrocracking, hydrogenation, hydrofinishing, unrefined, refined, and re-refined oils, and mixtures thereof.

Unrefined oils are those derived from a natural, mineral, or synthetic source without or with little further purification treatment. Refined oils are similar to the unrefined oils except that they have been treated in one or more purification steps, which may result in the improvement of one or more properties. Examples of suitable purification techniques are solvent extraction, secondary distillation, acid or base extraction, filtration, percolation, and the like. Oils refined to the quality of an edible may or may not be useful. Edible oils may also be called white oils. In some embodiments, lubricating oil compositions are free of edible or white oils.

Re-refined oils are also known as reclaimed or reprocessed oils. These oils are obtained similarly to refined oils using the same or similar processes. Often these oils are additionally processed by techniques directed to removal of spent additives and oil breakdown products.

Mineral oils may include oils obtained by drilling or from plants and animals or any mixtures thereof. For example such oils may include, but are not limited to, castor oil, lard oil, olive oil, peanut oil, corn oil, soybean oil, and linseed oil, as well as mineral lubricating oils, such as liquid petroleum oils and solvent-treated or acid-treated mineral lubricating oils of the paraffinic, naphthenic or mixed paraffinic-naphthenic types. Such oils may be partially or fully hydrogenated, if desired. Oils derived from coal or shale may also be useful.

Useful synthetic lubricating oils may include hydrocarbon oils such as polymerized, oligomerized, or interpolymerized olefins (e.g., polybutylenes, polypropylenes, propyleneisobutylene copolymers); poly(1-hexenes), poly(1-octenes), trimers or oligomers of 1-decene, e.g., poly(1-decenes), such materials being often referred to as alpha-olefins, and mixtures thereof; alkyl-benzenes (e.g. dodecylbenzenes, tetradecylbenzenes, dinonylbenzenes, di-(2-ethylhexyl)-benzenes); polyphenyls (e.g., biphenyls, terphenyls, alkylated polyphenyls); diphenyl alkanes, alkylated diphenyl alkanes, alkylated diphenyl ethers and alkylated diphenyl sulfides and the derivatives, analogs and homologs thereof or mixtures thereof. Polyalphaolefins are typically hydrogenated materials.

Other synthetic lubricating oils include polyol esters, diesters, liquid esters of phosphorus-containing acids (e.g., tricresyl phosphate, trioctyl phosphate, and the diethyl ester of decane phosphonic acid), or polymeric tetrahydrofurans. Synthetic oils may be produced by Fischer-Tropsch reactions and typically may be hydroisomerized Fischer-Tropsch hydrocarbons or waxes. In one embodiment oils may be prepared by a Fischer-Tropsch gas-to-liquid synthetic procedure as well as other gas-to-liquid oils.

The major amount of base oil included in a lubricating composition may be selected from the group consisting of Group I, Group II, a Group III, a Group IV, a Group V, and a combination of two or more of the foregoing, and wherein the major amount of base oil is other than base oils that arise from provision of additive components or viscosity index improvers in the composition. In another embodiment, the major amount of base oil included in a lubricating composition may be selected from the group consisting of Group II, a Group III, a Group IV, a Group V, and a combination of two or more of the foregoing, and wherein the major amount of base oil is other than base oils that arise from provision of additive components or viscosity index improvers in the composition.

The amount of the oil of lubricating viscosity in the compositions herein may be the balance remaining after subtracting from 100 weight percent the sum of the amount of the performance additives. For example, the oil of lubricating viscosity that may be present in a finished fluid may be a "major amount," such as greater than about 50 weight percent, greater than about 60 weight percent, greater than about 70 weight percent, greater than about 80 weight percent, greater than about 85 weight percent, greater than about 90 weight percent, or greater than 95 weight percent.

In some approaches, a preferred base oil or base oil of lubricating viscosity has less than about 25 ppm sulfur, a viscosity index greater than about 120, and a kinematic viscosity at about 100° C. of about 2 to about 8 cSt. In other approaches, the base oil of lubricating viscosity has less than about 25 ppm sulfur, a viscosity index greater than 120, and a kinematic viscosity at 100° C. of about 4 cSt. The base oil may have CP (paraffinic carbon content) of greater than 40%, greater than 45%, greater than 50%, greater than 55%, or greater than 90%. The base oil may have a CA (aromatic carbon content) of less than 5%, less than 3%, or less than 1%. The base oil may have a CN (naphthenic carbon content) of less than 60%, less than 55%, less than 50%, or less than 50% and greater than 30%. The base oil may have a ratio of 1 ring naphthenes to 2-6 ring naphthenes of less than 2 or less than 1.5 or less than 1.

In some embodiments, the lubricant composition may also include one or more further optional additives as discussed below.

Phosphorus-Containing Compounds: The lubricant composition herein may comprise one or more phosphorus-containing compounds that may impart anti-wear benefits to the fluid. The one or more phosphorus-containing compounds may be present in the lubricating oil composition in an amount ranging from about 0 weight percent to about 15 weight percent, or about 0.01 weight percent to about 10 weight percent, or about 0.05 weight percent to about 5 weight percent, or about 0.1 weight percent to about 3 weight percent of the lubricating oil composition. The phosphorus-containing compound may provide up to 5000 ppm phosphorus, or from about 50 to about 5000 ppm phosphorus, or from about 300 to about 1500 ppm phosphorus, or up to 600 ppm phosphorus, or up to 900 ppm phosphorus to the lubricant composition.

The one or more phosphorus-containing compounds include metal containing phosphorus-containing compounds and/or ashless phosphorus-containing compounds. Examples of suitable phosphorus-containing compound include, but are not limited to, thiophosphates, dithiophosphates, metal phosphates, metal thiophosphates, metal dithiophosphates, phosphates, phosphoric acid esters, phosphate esters, phosphites, phosphonates, phosphorus-containing carboxylic esters, ethers, or amides salts thereof, and mixtures thereof. Phosphorus containing anti-wear agents are more fully described in European Patent 0612839.

It should be noted that often the term phosphonate and phosphite are used often interchangeably in the lubricant industry. For example, dibutyl hydrogen phosphonate is often referred to as dibutyl hydrogen phosphite. It is within the scope of the present invention for the inventive lubricant composition to include a phosphorus-containing compound that may be referred to as either a phosphite or a phosphonate.

In any of the above described phosphorus-containing compounds, the compound may have about 5 to about 20 weight percent phosphorus, or about 5 to about 15 weight percent phosphorus, or about 8 to about 16 weight percent phosphorus, or about 6 to about 9 weight percent phosphorus.

The inclusion of the phosphorus-containing compound in combination with the above described dispersant to a lubricant compositions unexpectedly imparts positive frictional characteristics, such as a low friction coefficient, to the lubricant composition. The inventive effect is even further pronounced in some cases where the phosphorus-containing compound, on its own, imparts negative frictional characteristics to the fluid. When these relatively poor friction reducing phosphorus-containing compounds are combined with the olefin copolymer dispersant described herein, the lubricant composition has an improved, i.e., lower, friction coefficient. That is, the dispersants herein tend to transform fluids containing phosphorus-containing compounds having relatively poor friction coefficients into fluids with improved frictional properties.

This improvement in frictional properties of the lubricating compositions including the phosphorus-containing compounds and the olefin copolymer dispersant described herein is surprising because the frictional properties of the fluid are better than combinations of the phosphorus-containing compounds in combination with other types of dispersants, including polyisobutylene succinimide dispersants and olefin copolymer succinimide dispersants that do not have the specified characteristics of the copolymers described above.

One type of phosphorus-containing compound that when combined with the dispersant herein imparts improved frictional characteristics to a lubricating composition is a metal dihydrocarbyl dithiophosphate compound, such as but not limited to, a zinc dihydrocarbyl dithiophosphate compound (ZDDP). When the phosphorus-containing compound is a metal thiophosphate or metal dithiophosphate, such as ZDDP, it may include between 5 to about 10 weight percent metal, about 6 to about 9 weight percent metal, about 8 to 18 weight percent sulfur, about 12 to about 18 weight percent sulfur, or about 8 to about 15 weight percent sulfur. Suitable metal dihydrocarbyl dithiophosphates may comprise dihydrocarbyl dithiophosphate metal salts wherein the metal may be an alkali metal, alkaline earth metal, aluminum, lead, tin, molybdenum, manganese, nickel, copper, titanium, zirconium, zinc, or combinations thereof.

When the phosphorus-containing compound is a ZDDP, the alkyl groups on ZDDP may be derived from primary alcohols, secondary alcohols, phenols, and/or mixtures thereof. For example, all of the alkyl groups of ZDDP may be derived from a secondary alcohol such as methyl isobutyl carbinol, or from a mixture of secondary alcohols such as methyl isobutyl carbinol and isopropyl alcohol. In some cases, the alkyl groups of the ZDDP may be derived from a mixture of primary and secondary alcohols, such as 2-ethyl hexanol, isobutanol, and isopropanol. For example, in one embodiment, about 20% of the alkyl groups are derived from 2-ethyl hexanol, about 40% of the alkyl groups are derived from isobutanol, and about 40% of the alkyl groups are derived from isopropanol. In other embodiments, all of the alkyl groups on the ZDDP may be derived from a primary alcohol, such as 2-ethyl hexanol. ZDDPs may include about 6 to about 10 weight percent phosphorus, about 6 to about 9 weight percent zinc, and about 12 to about 18 weight percent sulfur.

Examples of such ZDDPs include, but are not limited to: zinc O,O-di(C1-14-alkyl)dithiophosphate; zinc (mixed O,O-bis(sec-butyl and isooctyl)) dithiophosphate; zinc-O,O-bis (branched and linear C3-8-alkyl)dithiophosphate; zinc O,O-bis(2-ethylhexyl)dithiophosphate; zinc O,O-bis(mixed isobutyl and pentyl)dithiophosphate; zinc mixed O,O-bis(1, 3-dimethylbutyl and isopropyl)dithiophosphate; zinc O,O-diisooctyl dithiophosphate; zinc O,O-dibutyl dithiophosphate; zinc mixed O,O-bis(2-ethylhexyl and isobutyl and isopropyl)dithiophosphate; zinc O,O-bis(dodecylphenyl)dithiophosphate; zinc O,O-diisodecyl dithiophosphate; zinc O-(6-methylheptyl)-O-(1-methylpropyl)dithiophosphate; zinc O-(2-ethylhexyl)-O-(isobutyl)dithiophosphate; zinc O,O-diisopropyl dithiophosphate; zinc (mixed hexyl and isopropyl)dithiophosphate; zinc (mixed O-(2-ethylhexyl) and O-isopropyl) dithiophosphate; zinc O,O-dioctyl dithiophosphate; zinc O,O-dipentyl dithiophosphate; zinc O-(2- methylbutyl)-O-(2-methylpropyl)dithiophosphate; and zinc O-(3-methylbutyl)-O-(2-methylpropyl)dithiophosphate.

The phosphorus-containing compound may have the formula:

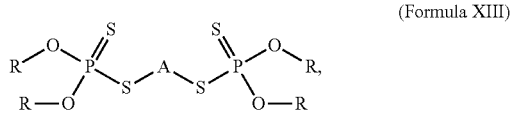

(Formula XIII)

wherein R in Formula XIII independently contains from 1 to 18 carbon atoms, or 2 to 12 carbon atoms, or about 3 to 8 carbon atoms. For example, R may be ethyl, n-propyl, i-propyl, n-butyl, i-butyl, sec-butyl, amyl, n-hexyl, i-hexyl, n-octyl, decyl, dodecyl, octadecyl, 2-ethylhexyl, phenyl, butylphenyl, cyclohexyl, methylcyclopentyl, propenyl, butenyl. The number of carbon atoms in each R group in the formula above will generally be about 3 or greater, about 4 or greater, about 6 or greater, or about 8 or greater. Each R group may average 3 to 8 carbons. The total number of carbon atoms in the R groups may be 5 to about 72, or 12 to about 32. In Formula XIII, A is a metal, such as aluminum, lead, tin, molybdenum, manganese, nickel, copper, titanium, zirconium, zinc, or combinations thereof. When the phosphorus-containing compound has the structure shown in Formula XIII, the compound may have about 6 to about 9 weight percent phosphorus.

In some embodiments, the phosphorous-containing compound of the present invention has the structure of Formula XIII wherein A is zinc and the compound provides between 70-800 ppm phosphorus to the lubricant composition.

It is understood in the art that a more accurate representation of the sulfur-zinc coordination arrangement may be represented by the symmetrical arrangement shown below the chemical structure of Formula XIII used herein is interchangeable with Formula XIII' shown below. It is also understood that the structures shown in Formulas XIII and XIII' may be present as monomer, dimer, trimer, or oligomer (such as a tetramer).

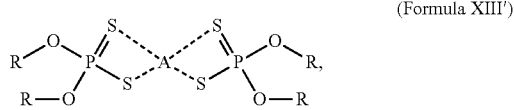

(Formula XIII')

Dihydrocarbyl dithiophosphate metal salts may be prepared in accordance with known techniques by first forming a dihydrocarbyl dithiophosphoric acid (DDPA), usually by reaction of one or more alcohols or phenols with P2S5 and then neutralizing the formed DDPA with a metal compound, such as zinc oxide. For example, DDPA may be made by reacting mixtures of primary and secondary alcohols with P2S5. In this case, the DDPA includes alkyl groups derived from both primary and secondary alcohols. Alternatively, multiple DDPAs can be prepared where the alkyl groups on one DDPA are derived entirely from secondary alcohols and the alkyl groups on another DDPA are derived entirely from primary alcohols. The DDPAs are then blended together to form a mixture of DDPAs having alkyl groups derived from both primary and secondary alcohols.

To make the metal salt, any basic or neutral metal compound could be used but the oxides, hydroxides and carbonates are most generally employed. Commercial additives frequently contain an excess of metal due to the use of an excess of the basic metal compound in the neutralization reaction.

Another type of phosphorus-containing compound that when combined with the olefin copolymer dispersant herein imparts improved frictional characteristics to a lubricating composition is an ashless (metal free) phosphorus-containing compound.

In some embodiments, the ashless phosphorus-containing compound may be dialkyl dithiophosphate ester, amyl acid phosphate, diamyl acid phosphate, dibutyl hydrogen phosphonate, dimethyl octadecyl phosphonate, salts thereof, and mixtures thereof.

The ashless phosphorus-containing compound may be have the formula:

(Formula XIV)

wherein R1 is S or O; R2 is —OR", —OH, or —R"; R3 is —OR", —OH, or SR"'C(O)OH; R4 is —OR"; R"' is C1 to C3 branched or linear alkyl chain; and R" is a C1 to C18 hydrocarbyl chain. When the phosphorous-containing compound has the structure shown in Formula XIV, the compound may have about 8 to about 16 weight percent phosphorus.

In some embodiments the lubricant composition comprises a phosphorus-containing compound of Formula XIV wherein R1 is S; R2 is —OR"; R3 is S R"'COOH; R4 is —OR"; R"' is C3 branched alkyl chain; R" is C4; and wherein the phosphorus-containing compound is present in an amount to deliver between 80-900 ppm phosphorus to the lubricant composition.

In another embodiment, the lubricant composition comprises a phosphorus-containing compound of Formula XIV wherein R1 is O; R2 is —OH; R3 is —OR" or —OH; R4 is —OR"; R" is C5; and wherein phosphorus-containing compound is present in an amount to deliver between 80-1500 ppm phosphorus to the lubricant composition.

In yet another embodiment, the lubricant composition comprises a phosphorus-containing compound of Formula XIV wherein R1 is O; R2 is OR"; R3 is H; R4 is —OR"; R" is C4; and wherein the one or more phosphorus-containing compound(s) is present in an amount to deliver between 80-1550 ppm phosphorus to the lubricant composition.

In other embodiments, the lubricant composition comprises a phosphorus-containing compound of Formula XIV wherein R1 is O; R2 is —R"; R3 is —OCH3 or —OH; R4 is —OCH3; R" is C18; and wherein the one or more phosphorus-containing compound(s) is present in an amount to deliver between 80-850 ppm phosphorus to the lubricant composition.

In some embodiments, the phosphorus-containing compound has the structure shown in Formula XIV and delivers about 80 to about 4500 ppm phosphorus to the lubricant composition. In other embodiments, the phosphorus-containing compound is present in an amount to deliver between about 150 and about 1500 ppm phosphorus, or between about 300 and about 900 ppm phosphorus, or between about 800 to 1600 ppm phosphorus, or about 900 to about 1800 ppm phosphorus, to the lubricant composition.

Anti-wear Agents: The lubricant composition may also include additional anti-wear agents that are non-phosphorus-containing compounds. Examples of such antiwear agents include borate esters, borate epoxides, thiocarbamate compounds (including thiocarbamate esters, alkylene-coupled thiocarbamates, and bis(S-alkyldithiocarbamyl)disulfides, thiocarbamate amides, thiocarbamic ethers, alkylene-coupled thiocarbamates, and bis(S-alkyldithiocarbamyl) disulfides, and mixtures thereof), sulfurized olefins, tridecyl adipate, titanium compounds, and long chain derivatives of hydroxyl carboxylic acids, such as tartrate derivatives, tartramides, tartrimides, citrates, and mixtures thereof. A suitable thiocarbamate compound is molybdenum dithiocarbamate. Suitable tartrate derivatives or tartrimides may contain alkyl-ester groups, where the sum of carbon atoms on the alkyl groups may be at least 8. The tartrate derivative or tartrimide may contain alkyl-ester groups, where the sum of carbon atoms on the alkyl groups may be at least 8. The antiwear agent may in one embodiment include a citrate. The additional anti-wear agent may be present in ranges including about 0 weight percent to about 15 weight percent, or about 0.01 weight percent to about 10 weight percent, or about 0.05 weight percent to about 5 weight percent, or about 0.1 weight percent to about 3 weight percent of the lubricating oil composition.

Detergents: The lubricant composition may optionally further comprise one or more neutral, low based, or overbased detergents, and mixtures thereof. Suitable detergent substrates include phenates, sulfur-containing phenates, sulfonates, calixarates, salixarates, salicylates, carboxylic acids, phosphorus acids, mono- and/or di-thiophosphoric acids, alkyl phenols, sulfur coupled alkyl phenol compounds, or methylene bridged phenols. Suitable detergents and their methods of preparation are described in greater detail in numerous patent publications, including U.S. Pat. No. 7,732,390 and references cited therein. The detergent substrate may be salted with an alkali or alkaline earth metal such as, but not limited to, calcium, magnesium, potassium, sodium, lithium, barium, zinc, or mixtures thereof.

A suitable detergent may include alkali or alkaline earth metal salts, e.g., calcium or magnesium, of petroleum sulfonic acids and long chain mono- or di-alkylaryl sulfonic acids with the aryl group being benzyl, tolyl, and xylyl. Examples of other suitable detergents include, but are not limited to low-based/neutral and overbased variations of the following detergents: calcium phenates, calcium sulfur containing phenates, calcium sulfonates, calcium calixarates, calcium salixarates, calcium salicylates, calcium carboxylic acids, calcium phosphorus acids, calcium mono- and/or di-thiophosphoric acids, calcium alkyl phenols, calcium sulfur coupled alkyl phenol compounds, calcium methylene bridged phenols, magnesium phenates, magnesium sulfur containing phenates, magnesium sulfonates, magnesium calixarates, magnesium salixarates, magnesium salicylates, magnesium carboxylic acids, magnesium phosphorus acids, magnesium mono- and/or di-thiophosphoric acids, magnesium alkyl phenols, magnesium sulfur coupled alkyl phenol compounds, magnesium methylene bridged phenols, sodium phenates, sodium sulfur containing phenates, sodium sulfonates, sodium calixarates, sodium salixarates, sodium salicylates, sodium carboxylic acids, sodium phosphorus acids, sodium mono- and/or di-thiophosphoric acids, sodium alkyl phenols, sodium sulfur coupled alkyl phenol compounds, or sodium methylene bridged phenols.

The detergent may be present at about 0 weight percent to about 10 weight percent, or about 0.1 weight percent to about 8 weight percent, or about 1 weight percent to about 4 weight percent, or greater than about 4 weight percent to about 8 weight percent. In other approaches, the detergent may be provided in the lubricating oil composition in an amount to provide about 450 to about 2200 ppm metal to the lubricant composition and to deliver a soap content of about 0.4 to about 1.5 weight percent to the lubricant composition. In other approaches, the detergent is in an amount to provide about 450 to about 2200 ppm metal to the lubricant composition and to deliver a soap content of about 0.4 to about 0.7 weight percent to the lubricant composition.

Overbased detergent additives are well-known in the art and may be alkali or alkaline earth metal overbased detergent additives. Such detergent additives may be prepared by reacting a metal oxide or metal hydroxide with a substrate and carbon dioxide gas. The substrate is typically an acid, for example, an acid such as an aliphatic substituted sulfonic acid, an aliphatic substituted carboxylic acid, or an aliphatic substituted phenol.

The term "overbased" relates to metal salts, such as metal salts of sulfonates, carboxylates, salicylates and/or phenates, wherein the amount of metal present exceeds the stoichiometric amount. Such salts may have a conversion level in excess of 100% (i.e., they may comprise more than 100% of the theoretical amount of metal needed to convert the acid to its "normal," "neutral" salt). The expression "metal ratio," often abbreviated as MR, is used to designate the ratio of total chemical equivalents of metal in the overbased salt to chemical equivalents of the metal in a neutral salt according to known chemical reactivity and stoichiometry. In a normal or neutral salt, the MR is one and in an overbased salt, MR, is greater than one. They are commonly referred to as overbased, hyperbased, or superbased salts and may be salts of organic sulfur acids, carboxylic acids, or phenols.

As used herein, the term "TBN" is used to denote the Total Base Number in mg KOH/g as measured by the method of ASTM D2896. An overbased detergent of the lubricating oil composition may have a total base number (TBN) of about 200 mg KOH/gram or greater, or about 250 mg KOH/gram or greater, or about 350 mg KOH/gram or greater, or about 375 mg KOH/gram or greater, or about 400 mg KOH/gram or greater. The overbased detergent may have a metal to substrate ratio of from 1.1:1, or from 2:1, or from 4:1, or from 5:1, or from 7:1, or from 10:1.

Examples of suitable overbased detergents include, but are not limited to, overbased calcium phenates, overbased calcium sulfur containing phenates, overbased calcium sulfonates, overbased calcium calixarates, overbased calcium salixarates, overbased calcium salicylates, overbased calcium carboxylic acids, overbased calcium phosphorus acids, overbased calcium mono- and/or di-thiophosphoric acids, overbased calcium alkyl phenols, overbased calcium sulfur coupled alkyl phenol compounds, overbased calcium methylene bridged phenols, overbased magnesium phenates, overbased magnesium sulfur containing phenates, overbased magnesium sulfonates, overbased magnesium calixarates, overbased magnesium salixarates, overbased magnesium salicylates, overbased magnesium carboxylic acids, overbased magnesium phosphorus acids, overbased magnesium mono- and/or di-thiophosphoric acids, overbased magnesium alkyl phenols, overbased magnesium sulfur coupled alkyl phenol compounds, or overbased magnesium methylene bridged phenols.

The overbased detergent may comprise at least 97.5 weight percent of the total detergent in the lubricating oil composition. In some embodiments, at least 96 weight percent, or at least 94 weight percent, or at least 92 weight percent, or at least 90 weight percent or at least 88 weight percent or at least 80 weight percent of the total detergent in the lubricating oil composition is overbased detergent.

The low-based/neutral detergent has a TBN of up to 175 mg KOH/g, or up to 150 mg KOH/g. The low-based/neutral detergent may include a calcium or magnesium-containing detergent. Examples of suitable low-based/neutral detergent include, but are not limited to, calcium sulfonates, calcium phenates, calcium salicylates, magnesium sulfonates, magnesium phenates, and magnesium salicylates. In some embodiments, the low-based/neutral detergent is a mixture of calcium-containing detergents and or magnesium-containing detergents.

The low-based/neutral detergent may comprise at least 2.5 weight percent of the total detergent in the lubricating oil composition. In some embodiments, at least 4 weight percent, or at least 6 weight percent, or at least 8 weight percent, or at least 10 weight percent or at least 12 weight percent or at least 20 weight percent of the total detergent in the lubricating oil composition is a low-based/neutral detergent which may optionally be a low-based/neutral calcium-containing detergent.

In certain embodiments, the one or more low-based/neutral detergents provide from about 50 to about 1000 ppm calcium or magnesium by weight to the lubricating oil composition based on a total weight of the lubricating oil composition. In some embodiments, the one or more low-based/neutral calcium-containing detergents provide from 75 to less than 800 ppm, or from 100 to 600 ppm, or from 125 to 500 ppm by weight calcium or magnesium to the lubricant composition based on a total weight of the lubricant composition.

Extreme Pressure Agents: The lubricant compositions of the disclosure may also contain at least one extreme pressure agent. The extreme pressure agent may contain sulfur and may contain at least 12 percent by weight sulfur. In some embodiments, the extreme pressure agent added to the lubricating oil is sufficient to provide at least 350 ppm sulfur, 500 ppm sulfur, 760 ppm sulfur, from about 350 to about 2,000 ppm sulfur, from about 2,000 to about 30,000 ppm sulfur, or from about 2,000 to about 4,800 ppm sulfur, or about 4,000 to about 25,000 ppm sulfur to the lubricant composition.

A wide variety of sulfur-containing extreme pressure agents are suitable and include sulfurized animal or vegetable fats or oils, sulfurized animal or vegetable fatty acid esters, fully or partially esterified esters of trivalent or pentavalent acids of phosphorus, sulfurized olefins (see, for example U.S. Pat. Nos. 2,995,569; 3,673,090; 3,703,504; 3,703,505; 3,796,661; 3,873,454 4,119,549; 4,119,550; 4,147,640; 4,191,659; 4,240,958; 4,344,854; 4,472,306; and 4,711,736), dihydrocarbyl polysulfides (see for example U.S. Pat. Nos. 2,237,625; 2,237,627; 2,527,948; 2,695,316; 3,022,351; 3,308,166; 3,392,201; 4,564,709; and British 1,162,334), functionally-substituted dihydrocarbyl polysulfides (see for example U.S. Pat. No. 4,218,332), and polysulfide olefin products (see for example U.S. Pat. No. 4,795,576). Other suitable examples include organo-sulfur compounds selected from sulfurized olefins, sulfur-containing amino heterocyclic compounds, 5-dimercapto-1,3,4-thiadiazole, polysulfides having a majority of S3 and S4 sulfides, sulfurized fatty acids, sulfurized branched olefins, organic polysulfides, and mixtures thereof.

In some embodiments the extreme pressure agent is present in the lubricating composition in an amount of up to about 3.0 weight percent or up to about 5.0 weight percent. In other embodiments, the extreme pressure agent is present from about 0.05 weight percent to about 0.5 weight percent, based on the total lubricant composition. In other embodiments, the extreme pressure agent is present from about 0.1 weight percent to about 3.0 weight percent, based on the total lubricant composition. In other embodiments the extreme pressure agent is present in an amount between about 0.6 weight percent and about 1 weight percent, based on the total lubricant composition. In yet other embodiments, the detergent is present in an amount of about 1.0 weight percent, based on the total lubricant composition.

One suitable class of extreme pressure agents are polysulfides composed of one or more compounds represented by the formula: Ra-Sx-Rb where Ra and Rb are hydrocarbyl groups each of which may contain 1 to 18, and in other approaches, 3 to 18 carbon atoms and x is may be in the range of from 2 to 8, and typically in the range of from 2 to 5, especially 3. In some approaches, x is an integer from 3 to 5 with about 30 to about 60 percent of x being an integer of 3 or 4. The hydrocarbyl groups can be of widely varying types such as alkyl, cycloalkyl, alkenyl, aryl, or aralkyl. Tertiary alkyl polysulfides such as di-tert-butyl trisulfide, and mixtures comprising di-tert-butyl trisulfide (e.g., a mixture composed principally or entirely of the tri, tetra-, and pentasulfides) may be used. Examples of other useful dihydrocarbyl polysulfides include the diamyl polysulfides, the dinonyl polysulfides, the didodecyl polysulfides, and the dibenzyl polysulfides.

Another suitable class of extreme pressure agent is sulfurized isobutenes made by reacting an olefin, such as isobutene, with sulfur. Sulfurized isobutene (SIB), notably sulfurized polyisobutylene, typically has a sulfur content of from about 10 to about 55%, desirably from about 30 to about 50% by weight. A wide variety of other olefins or unsaturated hydrocarbons, e.g., isobutene dimer or trimer, may be used to form the sulfurized olefin extreme pressure agents. Various methods have been disclosed in the prior art for the preparation of sulfurized olefins. See, for example, U.S. Pat. No. 3,471,404 to Myers; U.S. Pat. No. 4,204,969 to Papay et al.; U.S. Pat. No. 4,954,274 to Zaweski et al.; U.S. Pat. No. 4,966,720 to DeGonia et al.; and U.S. Pat. No. 3,703,504 to Horodysky, et al, each of which his incorporated herein by reference.

Methods for preparing sulfurized olefins, including the methods disclosed in the aforementioned patents, generally involve formation of a material, typically referred to as an "adduct", in which an olefin is reacted with a sulfur halide, for example, sulfur monochloride. The adduct is then reacted with a sulfur source to provide the sulfurized olefin. The quality of a sulfurized olefin is generally measured by various physical properties, including, for example, viscosity, sulfur content, halogen content and copper corrosion test weight loss. U.S. Pat. No. 4,966,720, relates to sulfurized olefins useful as extreme pressure additives in lubrication oils and to a two stage reaction for their preparation.

Friction Modifiers: The lubricating oil compositions herein also may optionally contain one or more friction modifiers, such as friction modifiers selected from organic ashless nitrogen-free friction modifiers, organic ashless aminic friction modifiers, inorganic friction modifiers, and mixtures thereof. Suitable friction modifiers may also include metal containing and metal-free friction modifiers and may include, but are not limited to, imidazolines, amides, amines, succinimides, alkoxylated amines, alkoxylated ether amines, amine oxides, amidoamines, nitriles, betaines, quaternary amines, imines, amine salts, amino guanidine, alkanolamides, phosphonates, metal-containing compounds, glycerol esters, borated glycerol esters, partial esters of glycerol such as glycerol monooleate, fatty phosphites, fatty epoxides, sulfurized fatty compounds and olefins, sunflower oil other naturally occurring plant or animal oils, dicarboxylic acid esters, esters or partial esters of a polyol, one or more aliphatic or aromatic carboxylic acids, and the like. A friction modifier may optionally be included in the lubricating oil compositions herein in ranges from about 0 weight percent to about 10 weight percent, or about 0.01 weight percent to about 8 weight percent, or about 0.1 weight percent to about 4 weight percent.

Suitable friction modifiers may contain hydrocarbyl groups that are selected from straight chain, branched chain, or aromatic hydrocarbyl groups or mixtures thereof, and may be saturated or unsaturated. The hydrocarbyl groups may be composed of carbon and hydrogen or hetero atoms such as sulfur or oxygen. The hydrocarbyl groups may range from about 12 to about 25 carbon atoms. In some embodiments the friction modifier may be a long chain fatty acid ester. In another embodiment the long chain fatty acid ester may be a mono-ester, or a di-ester, or a (tri)glyceride. The friction modifier may be a long chain fatty amide, long chain fatty amine, a long chain fatty ester, a long chain fatty epoxide derivative, or a long chain imidazoline.

Other suitable friction modifiers may include organic, ashless (metal-free), nitrogen-free organic friction modifiers. Such friction modifiers may include esters formed by reacting carboxylic acids and anhydrides with alkanols and generally include a polar terminal group (e.g. carboxyl or hydroxyl) covalently bonded to an oleophilic hydrocarbon chain. An example of an organic ashless nitrogen-free friction modifier is known generally as glycerol monooleate (GMO) which may contain mono-, di-, and tri-esters of oleic acid. Other suitable friction modifiers are described in U.S. Pat. No. 6,723,685, herein incorporated by reference in its entirety.

Aminic friction modifiers may include amines or polyamines. Such compounds can have hydrocarbyl groups that are linear, either saturated or unsaturated, or a mixture thereof and may contain from about 12 to about 25 carbon atoms. Further examples of suitable friction modifiers include alkoxylated amines and alkoxylated ether amines. Such compounds may have hydrocarbyl groups that are linear, either saturated, unsaturated, or a mixture thereof. They may contain from about 12 to about 25 carbon atoms. Examples include ethoxylated amines and ethoxylated ether amines.

The amines and amides may be used as such or in the form of an adduct or reaction product with a boron compound such as a boric oxide, boron halide, metaborate, boric acid or a mono-, di- or tri-alkyl borate. Other suitable friction modifiers are described in U.S. Pat. No. 6,300,291, herein incorporated by reference in its entirety.

Suitable friction modifiers include glycerides, fatty acids, glycerol monooleate, fatty alkyl tartrate derivatives, imidazolines, alkoxy amines, alkyl fatty amines, acyl glycines, cerium nanoparticles, titanium-containing compounds, molybdenum-containing compounds, and mixtures thereof. The titanium-containing compound may be a reaction product of titanium alkoxide and neodecanoic acid. The cerium nanoparticle may be obtained from the reaction product of an organo-cerium salt, a fatty acid, and an amine in the substantial absence of water and organic solvent at a temperature from about 150° C. to about 250° C. The cerium nanoparticles may have a particle size less than about 10 nanometers. Suitable fatty acids may be those including C10 to C30 saturated, monounsaturated, or polyunsaturated carboxylic acid and the amine is a fatty amine selected from C8 to C30 saturated or unsaturated amines.

In some approaches, the friction modifier may be a glycerides having the formula

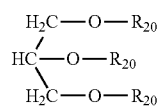

(Formula XV)

wherein each R20 is independently selected from the group consisting of H and —C(O)R''' wherein R''' may be a saturated or an unsaturated alkyl group having from 3 to 23 carbon atoms.

The friction modifier may also be imidazolines having the formula

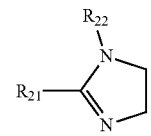

(Formula XVI)

wherein R21 is an alkyl or alkenyl group containing from about 10 to about 30 carbon atoms and R22 is a hydroxyalkyl group containing from about 2 to about 4 carbon atoms.

The friction modifier may also be alkoxy amines including an N-aliphatic hydrocarbyl-substituted diethanolamine in which the N-aliphatic hydrocarbyl-substituent is at least one straight chain aliphatic hydrocarbyl group free of acetylenic unsaturation and having 14 to 20 carbon atoms.

The friction modifier may further bean alkyl fatty amines include aliphatic primary fatty amines selected from n-hexylamine, n-octylamine, n-decylamine, n-dodecylamine, n-tetradecylamine, n-pentadecylamine, n-hexadecylamine, n-octadecylamine, and mixtures thereof.

The friction modifier may be an acyl glycine and have the formula

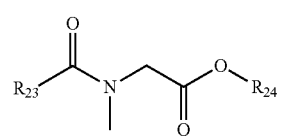

(Formula XVII)

wherein R23 is a linear or branched, saturated, unsaturated, or partially saturated hydrocarbyl having about 8 to about 22 carbon atoms and R24 is hydrogen, a hydrocarbyl having 1 to 8 carbon atoms, or a C1 to C8 hydrocarbyl group containing one or more heteroatoms.

Antioxidants: The lubricating oil compositions herein also may optionally contain one or more antioxidants. Antioxidant compounds are known and include for example, phenates, phenate sulfides, sulfurized olefins, phosphosulfurized terpenes, sulfurized esters, aromatic amines, alkylated diphenylamines (e.g., nonyl diphenylamine, di-nonyl diphenylamine, octyl diphenylamine, di-octyl diphenylamine), phenyl-alpha-naphthylamines, alkylated phenyl-alpha-naphthylamines, hindered non-aromatic amines, phenols, hindered phenols, oil-soluble molybdenum compounds, macromolecular antioxidants, or mixtures thereof. Antioxidant compounds may be used alone or in combination.

The hindered phenol antioxidant may contain a secondary butyl and/or a tertiary butyl group as a sterically hindering group. The phenol group may be further substituted with a hydrocarbyl group and/or a bridging group linking to a second aromatic group. Examples of suitable hindered phenol antioxidants include 2,6-di-tert-butylphenol, 4-methyl-2,6-di-tert-butylphenol, 4-ethyl-2,6-di-tert-butylphenol, 4-propyl-2,6-di-tert-butylphenol or 4-butyl-2,6-di-tert-butylphenol, or 4-dodecyl-2,6-di-tert-butylphenol. In one embodiment the hindered phenol antioxidant may be an ester and may include, e.g., Irganox® L-135 available from BASF or an addition product derived from 2,6-di-tert-butylphenol and an alkyl acrylate, wherein the alkyl group may contain about 1 to about 18, or about 2 to about 12, or about 2 to about 8, or about 2 to about 6, or about 4 carbon atoms. Another commercially available hindered phenol antioxidant may be an ester and may include Ethanox® 4716 available from Albemarle Corporation.

Useful antioxidants may include diarylamines and phenols. In an embodiment, the lubricating oil composition may contain a mixture of a diarylamine and a phenol, such that each antioxidant may be present in an amount sufficient to provide up to about 5 weight percent, based on the weight of the lubricant composition. In an embodiment, the antioxidant may be a mixture of about 0.3 to about 1.5 weight percent diarylamine and about 0.4 to about 2.5 weight percent phenol, based on the lubricant composition.

Examples of suitable olefins that may be sulfurized to form a sulfurized olefin include propylene, butylene, isobutylene, polyisobutylene, pentene, hexene, heptene, octene, nonene, decene, undecene, dodecene, tridecene, tetradecene, pentadecene, hexadecene, heptadecene, octadecene, nonadecene, eicosene or mixtures thereof. In one embodiment, hexadecene, heptadecene, octadecene, nonadecene, eicosene or mixtures thereof and their dimers, trimers and tetramers are especially useful olefins. Alternatively, the olefin may be a Diels-Alder adduct of a diene such as 1,3-butadiene and an unsaturated ester, such as, butylacrylate.

Another class of sulfurized olefin includes sulfurized fatty acids and their esters. The fatty acids are often obtained from vegetable oil or animal oil and typically contain about 4 to about 22 carbon atoms. Examples of suitable fatty acids and their esters include triglycerides, oleic acid, linoleic acid, palmitoleic acid or mixtures thereof. Often, the fatty acids are obtained from lard oil, tall oil, peanut oil, soybean oil, cottonseed oil, sunflower seed oil or mixtures thereof. Fatty acids and/or ester may be mixed with olefins, such as α-olefins.

The one or more antioxidant(s) may be present in ranges about 0 weight percent to about 20 weight percent, or about 0.1 weight percent to about 10 weight percent, or about 1 weight percent to about 5 weight percent, of the lubricating oil composition.

Boron-Containing Compounds: The lubricant composition herein may optionally contain one or more boron-containing compounds. Examples of boron-containing compounds include borate esters, borated fatty amines, borated epoxides, borated detergents, and borated dispersants, such as borated succinimide dispersants, as disclosed in U.S. Pat. No. 5,883,057. The boron-containing compound, if present, can be used in an amount sufficient to provide the lubricant composition with a boron level of up to about 3000 ppm, about 5 ppm to about 2000 ppm, about 15 ppm to about 600 ppm, about 20 ppm to about 400 ppm, about 70 ppm to about 300 ppm.

Dispersants: Additional dispersants contained in the lubricant composition may include, but are not limited to, an oil soluble polymeric hydrocarbon backbone having functional groups that are capable of associating with particles to be dispersed. Typically, the dispersants comprise amine, alcohol, amide, or ester polar moieties attached to the polymer backbone often via a bridging group. Dispersants may be selected from Mannich dispersants as described in U.S. Pat. Nos. 3,634,515, 3,697,574 and 3,736,357; ashless succinimide dispersants as described in U.S. Pat. Nos. 4,234,435 and 4,636,322; amine dispersants as described in U.S. Pat. Nos. 3,219,666, 3,565,804, and 5,633,326; Koch dispersants as described in U.S. Pat. Nos. 5,936,041, 5,643,859, and 5,627,259, and polyalkylene succinimide dispersants as described in U.S. Pat. Nos. 5,851,965; 5,853,434; and 5,792,729.

In some embodiments, the additional dispersant may be derived from a polyalphaolefin (PAO) succinic anhydride, an olefin maleic anhydride copolymer. As an example, the additional dispersant may be described as a poly-PIBSA. In another embodiment, the additional dispersant may be derived from an anhydride which is grafted to an ethylene-propylene copolymer. Another additional dispersant may be a high molecular weight ester or half ester amide.

The additional dispersant, if present, can be used in an amount sufficient to provide up to about 10 weight percent, based upon the final weight of the lubricating oil composition. Another amount of the dispersant that can be used may be about 0.1 weight percent to about 10 weight percent, or about 0.1 weight percent to about 10 weight percent, or about 3 weight percent to about 8 weight percent, or about 1 weight percent to about 6 weight percent, based upon the final weight of the lubricating oil composition.

Molybdenum-Containing Compounds: The lubricating oil compositions herein also may optionally contain one or more molybdenum-containing compounds. An oil-soluble molybdenum compound may have the functional performance of an antiwear agent, an antioxidant, a friction modifier, or mixtures thereof.

Exemplary molybdenum-containing components may include molybdenum dithiocarbamates, molybdenum dialkyldithio phosphates, molybdenum dithiophosphinates, amine salts of molybdenum compounds, molybdenum xanthates, molybdenum thioxanthates, molybdenum sulfides, molybdenum carboxylates, molybdenum alkoxides, a trinuclearorgano-molybdenum compound, and/or mixtures thereof. Alternatively, an oil-soluble molybdenum compound may include molybdenum dithiocarbamates, molybdenum dialkyldithiophosphates, molybdenum dithiophosphinates, amine salts of molybdenum compounds, molybdenum xanthates, molybdenum thioxanthates, molybdenum sulfides, molybdenum carboxylates, molybdenum alkoxides, a trinuclear organo-molybdenum compound, and/or mixtures thereof. The molybdenum sulfides include molybdenum disulfide. The molybdenum disulfide may be in the form of a stable dispersion. In one embodiment the oil-soluble molybdenum compound may be selected from the group consisting of molybdenum dithiocarbamates, molybdenum dialkyldithiophosphates, amine salts of molybdenum compounds, and mixtures thereof. In one embodiment the oil-soluble molybdenum compound may be a molybdenum dithiocarbamate.

Suitable examples of molybdenum compounds which may be used include commercial materials sold under the trade names such as Molyvan® 822, Molyvan® A, Molyvan® 2000 and Molyvan® 855 from R. T. Vanderbilt Co., Ltd., and Sakura-Lube™ S-165, S-200, S-300, 5-310G, S-525, S-600, S-700, and S-710 available from Adeka Corporation, and mixtures thereof. Suitable molybdenum components are described in U.S. Pat. No. 5,650,381; US Pat. No. RE 37,363 E1; US Pat. No. RE 38,929 E1; and US Pat. No. RE 40,595 E1, incorporated herein by reference in their entireties.

Additionally, the molybdenum compound may be an acidic molybdenum compound. Included are molybdic acid, ammonium molybdate, sodium molybdate, potassium molybdate, and other alkaline metal molybdates and other molybdenum salts, e.g., hydrogen sodium molybdate, MoOCl4, MoO2Br2, Mo2O3Cl6, molybdenum trioxide or similar acidic molybdenum compounds. Alternatively, the compositions can be provided with molybdenum by molybdenum/sulfur complexes of basic nitrogen compounds as described, for example, in U.S. Pat. Nos. 4,263,152; 4,285,822; 4,283,295; 4,272,387; 4,265,773; 4,261,843; 4,259,195 and 4,259,194; and WO 94/06897, incorporated herein by reference in their entireties.

Another class of suitable organo-molybdenum compounds are trinuclear molybdenum compounds, such as those of the formula Mo3SkLnQz and mixtures thereof, wherein S represents sulfur, L represents independently selected ligands having organo groups with a sufficient number of carbon atoms to render the compound soluble or dispersible in the oil, n is from 1 to 4, k varies from 4 through 7, Q is selected from the group of neutral electron donating compounds such as water, amines, alcohols, phosphines, and ethers, and z ranges from 0 to 5 and includes non-stoichiometric values. At least 21 total carbon atoms may be present among all the ligands' organo groups, such as at least 25, at least 30, or at least 35 carbon atoms. Additional suitable molybdenum compounds are described in U.S. Pat. No. 6,723,685, herein incorporated by reference in its entirety.

The oil-soluble molybdenum compound may be present in an amount sufficient to provide about 0.5 ppm to about 2000 ppm, about 1 ppm to about 700 ppm, about 1 ppm to about 550 ppm, about 5 ppm to about 300 ppm, or about 20 ppm to about 250 ppm of molybdenum.

Transition Metal-Containing Compounds: The lubricant compositions herein also may optionally contain a transition metal-containing compound or a metalloid. The transition metals may include, but are not limited to, titanium, vanadium, copper, zinc, zirconium, molybdenum, tantalum, tungsten, and the like. Suitable metalloids include, but are not limited to, boron, silicon, antimony, tellurium, and the like.

In an embodiment, a transition metal-containing compound may function as an antiwear agent, friction modifier, antioxidant, deposit control additive, or have multiple functions. In an embodiment transition metal-containing compound may be an oil-soluble titanium compound, such as a titanium (IV) alkoxide. Among the titanium containing compounds that may be used in, or which may be used for preparation of the oils-soluble materials of, the disclosed technology are various Ti (IV) compounds such as titanium (IV) oxide; titanium (IV) sulfide; titanium (IV) nitrate; titanium (IV) alkoxides such as titanium methoxide, titanium ethoxide, titanium propoxide, titanium isopropoxide, titanium butoxide, titanium 2-ethylhexoxide; and other titanium compounds or complexes including but not limited to titanium phenates; titanium carboxylates such as titanium (IV) 2-ethyl-1-3-hexanedioate or titanium citrate or titanium oleate; and titanium (IV) (triethanolaminato)isopropoxide. Other forms of titanium encompassed within the disclosed technology include titanium phosphates such as titanium dithiophosphates (e.g., dialkyldithiophosphates) and titanium sulfonates (e.g., alkylbenzenesulfonates), or, generally, the reaction product of titanium compounds with various acid materials to form salts, such as oil-soluble salts. Titanium compounds can thus be derived from, among others, organic acids, alcohols, and glycols. Ti compounds may also exist in dimeric or oligomeric form, containing Ti—O—Ti structures. Such titanium materials are commercially available or can be readily prepared by appropriate synthesis techniques which will be apparent to the person skilled in the art. They may exist at room temperature as a solid or a liquid, depending on the particular compound. They may also be provided in a solution form in an appropriate inert solvent.

In one embodiment, the titanium can be supplied as a Ti-modified dispersant, such as a succinimide dispersant. Such materials may be prepared by forming a titanium mixed anhydride between a titanium alkoxide and a hydrocarbyl-substituted succinic anhydride, such as an alkenyl- (or alkyl) succinic anhydride. The resulting titanate-succinate intermediate may be used directly or it may be reacted with any of a number of materials, such as (a) a polyamine-based succinimide/amide dispersant having free, condensable —NH functionality; (b) the components of a polyamine-based succinimide/amide dispersant, i.e., an alkenyl- (or alkyl-) succinic anhydride and a polyamine, (c) a hydroxy-containing polyester dispersant prepared by the reaction of a substituted succinic anhydride with a polyol, aminoalcohol, polyamine, or mixtures thereof. Alternatively, the titanate-succinate intermediate may be reacted with other agents such as alcohols, aminoalcohols, ether alcohols, polyether alcohols or polyols, or fatty acids, and the product thereof either used directly to impart Ti to a lubricant, or else further reacted with the succinic dispersants as described above. As an example, tetraisopropyl titanate may be reacted with polyisobutene-substituted succinic anhydride at 140-150° C. for 5 to 6 hours to provide a titanium modified dispersant or intermediate. The resulting material may be further reacted with a succinimide dispersant from polyisobutene-substituted succinic anhydride and a polyethylene polyamine to produce a titanium-modified succinimide dispersant.

Another titanium containing compound may be a reaction product of titanium alkoxide and C6 to C25 carboxylic acid. The reaction product may be represented by the following formula:

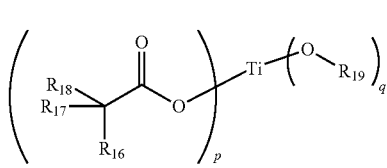

(Formula XVII)

wherein p+q=4; q ranges from 1 to 3; R19 is an alkyl moiety with carbon atoms ranging from 1-8; R16 is selected from a hydrocarbyl group containing from about 6 to 25 carbon atoms; R17, and R18 are the same or different and are selected from a hydrocarbyl group containing from about 1 to 6 carbon atoms; or by the formula:

(Formula XXIV)

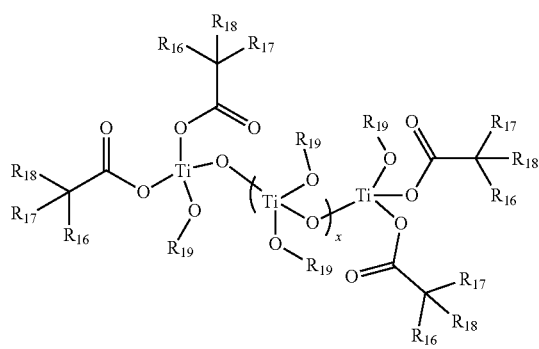

wherein in Formula XXIV, x ranges from 0 to 3; R16 is selected from a hydrocarbyl group containing from about 6 to 25 carbon atoms. R17, and R18 are the same or different and are selected from a hydrocarbyl group containing from about 1 to 6 carbon atoms; and/or R19 is selected from a group consisting of either H, or C6 to C25 carboxylic acid moiety. Suitable carboxylic acids may include, but are not limited to caproic acid, caprylic acid, lauric acid, myristic acid, palmitic acid, stearic acid, arachidic acid, oleic acid, erucic acid, linoleic acid, linolenic acid, cyclohexanecarboxylic acid, phenylacetic acid, benzoic acid, neodecanoic acid, and the like.

In an embodiment the oil soluble titanium compound may be present in the lubricating oil composition in an amount to provide from 0 to 3000 ppm titanium by weight or 25 to about 1500 ppm titanium by weight or about 35 ppm to 500 ppm titanium by weight or about 50 ppm to about 300 ppm.

Viscosity Index Improvers: In addition to the silicone functionalized viscosity index improver discussed above, the lubricant compositions herein also may optionally contain one or more additional viscosity index improvers. Suitable viscosity index improvers may include polyolefins, olefin copolymers, ethylene/propylene copolymers, polyisobutenes, hydrogenated styrene-isoprene polymers, styrene/maleic ester copolymers, hydrogenated styrene/butadiene copolymers, hydrogenated isoprene polymers, alpha-olefin maleic anhydride copolymers, polymethacrylates, polyacrylates, polyalkyl styrenes, hydrogenated alkenyl aryl conjugated diene copolymers, or mixtures thereof. Viscosity index improvers may include star polymers and suitable examples are described in US Publication No. 20120101017A1, which is incorporated herein by reference.

The lubricating oil compositions herein also may optionally contain one or more dispersant viscosity index improvers in addition to a viscosity index improver or in lieu of a viscosity index improver. Suitable viscosity index improvers may include functionalized polyolefins, for example, ethylene-propylene copolymers that have been functionalized with the reaction product of an acylating agent (such as maleic anhydride) and an amine; polymethacrylates functionalized with an amine, or esterified maleic anhydride-styrene copolymers reacted with an amine.

The total amount of viscosity index improver and/or silicone functional viscosity index improver may be about 0 weight percent to about 20 weight percent, about 0.1 weight percent to about 15 weight percent, about 0.1 weight percent to about 12 weight percent, or about 0.5 weight percent to about 10 weight percent, about 3 weight percent to about 20 weight percent, about 3 weight percent to about 15 weight percent, about 5 weight percent to about 15 weight percent, or about 5 weight percent to about 10 weight percent, of the lubricating oil composition.

In some embodiments, the viscosity index improver is a polyolefin or olefin copolymer having a number average molecular weight of about 10,000 to about 500,000, about 50,000 to about 200,000, or about 50,000 to about 150,000. In some embodiments, the viscosity index improver is a hydrogenated styrene/butadiene copolymer having a number average molecular weight of about 40,000 to about 500,000, about 50,000 to about 200,000, or about 50,000 to about 150,000. In some embodiments, the viscosity index improver is a polymethacrylate having a number average molecular weight of about 10,000 to about 500,000, about 50,000 to about 200,000, or about 50,000 to about 150,000.

Other Optional Additives: Other additives may be selected to perform one or more functions required of lubricant composition. Further, one or more of the mentioned additives may be multi-functional and provide functions in addition to or other than the function prescribed herein. The other additives may be in addition to specified additives of the present disclosure and/or may comprise one or more of metal deactivators, viscosity index improvers, detergents, ashless TBN boosters, friction modifiers, anti-wear agents, corrosion inhibitors, rust inhibitors, dispersants, dispersant viscosity index improvers, extreme pressure agents, antioxidants, foam inhibitors, demulsifiers, emulsifiers, pour point depressants, seal swelling agents and mixtures thereof. Typically, fully-formulated lubricating oil will contain one or more of these additives.

Suitable metal deactivators may include derivatives of benzotriazoles (typically tolyltriazole), dimercaptothiadiazole derivatives, 1,2,4-triazoles, benzimidazoles, 2-alkyldithiobenzimidazoles, or 2-alkyldithiobenzothiazoles; foam inhibitors including copolymers of ethyl acrylate and 2-ethylhexylacrylate and optionally vinyl acetate; demulsifiers including trialkyl phosphates, polyethylene glycols, polyethylene oxides, polypropylene oxides and (ethylene oxide-propylene oxide) polymers; pour point depressants including esters of maleic anhydride-styrene, polymethacrylates, polyacrylates or polyacrylamides.

Suitable foam inhibitors include silicon-based compounds, such as siloxane.

Suitable pour point depressants may include a polymethylmethacrylates or mixtures thereof. Pour point depressants may be present in an amount sufficient to provide from about 0 weight percent to about 1 weight percent, about 0.01 weight percent to about 0.5 weight percent, or about 0.02 weight percent to about 0.04 weight percent based upon the final weight of the lubricating oil composition.

Suitable rust inhibitors may be a single compound or a mixture of compounds having the property of inhibiting corrosion of ferrous metal surfaces. Non-limiting examples of rust inhibitors useful herein include oil-soluble high molecular weight organic acids, such as 2-ethylhexanoic acid, lauric acid, myristic acid, palmitic acid, oleic acid, linoleic acid, linolenic acid, behenic acid, and cerotic acid, as well as oil-soluble polycarboxylic acids including dimer and trimer acids, such as those produced from tall oil fatty acids, oleic acid, and linoleic acid. Other suitable corrosion inhibitors include long-chain alpha, omega-dicarboxylic acids in the molecular weight range of about 600 to about 3000 and alkenylsuccinic acids in which the alkenyl group contains about 10 or more carbon atoms such as, tetrapropenylsuccinic acid, tetradecenylsuccinic acid, and hexadecenylsuccinic acid. Another useful type of acidic corrosion inhibitors are the half esters of alkenyl succinic acids having about 8 to about 24 carbon atoms in the alkenyl group with alcohols such as the polyglycols. The corresponding half amides of such alkenyl succinic acids are also useful. A useful rust inhibitor is a high molecular weight organic acid. In some embodiments, an engine oil is devoid of a rust inhibitor.

The rust inhibitor, if present, can be used in an amount sufficient to provide about 0 weight percent to about 5 weight percent, about 0.01 weight percent to about 3 weight percent, about 0.1 weight percent to about 2 weight percent, based upon the final weight of the lubricating oil composition.

The lubricant composition may also include corrosion inhibitors (it should be noted that some of the other mentioned components may also have copper corrosion inhibition properties). Suitable inhibitors of copper corrosion include ether amines, polyethoxylated compounds such as ethoxylated amines and ethoxylated alcohols, imidazolines, monoalkyl and dialkyl thiadiazole, and the like.

Thiazoles, triazoles and thiadiazoles may also be used in the lubricants. Examples include benzotriazole, tolyltriazole, octyltriazole, decyltriazole, dodecyltriazole, 2-mercaptobenzothiazole, 2,5-dimercapto-1,3,4-thiadiazole, 2-mercapto-5-hydrocarbylthio-1,3,4-thiadiazoles, and 2-mercapto-5-hydrocarbyldithio-1,3,4-thiadiazoles. In one embodiment, the lubricant composition includes a 1,3,4-thiadiazole, such as 2-hydrocarbyldithio-5-mercapto-1,3,4-dithiadiazole.

Anti-foam/Surfactant agents may also be included in a fluid according to the present invention. Various agents are known for such use. Copolymers of ethyl acrylate and hexyl ethyl acrylate, such as PC-1244, available from Solutia may be used. In other embodiments, silicone fluids, such as 4% DCF may be included. Mixtures of anti-foam agents may also be present in the lubricant composition.

A suitable finished lubricant composition may include additive components in the ranges listed in the following Table 1.

TABLE 1A

Finished Oil Formulation

| Component | Wt. % (Suitable Embodiments) | Wt. % (Preferred Embodiments) |
|---|---|---|
| Silicone Functional OCP VII | 0.40 to 8 | 0.66 to 6.6 |
| Antioxidant(s) | 0.1-5.0 | 0.01-4.0 |
| Detergent(s) | 0.0-15.0 | 1.0-8.0 |
| Ashless TBN booster(s) | 0.0-1.0 | 0.01-0.5 |
| Corrosion inhibitor(s) | 0.0-5.0 | 0.1-3.0 |
| Metal dihydrocarbyl dithiophosphate(s) | 0.0-15.0 | 0.1-5.0 |
| Ash-free phosphorus compound(s) | 0.0-15.0 | 0.1-5.0 |
| Antifoaming agent(s) | 0.0-1.0 | 0.001-0.5 |
| Other Antiwear agent(s) | 0.0-1.0 | 0.0-0.8 |
| Pour point depressant(s) | 0.0-1.0 | 0.01-0.5 |
| Other Viscosity index improver(s) | 0.0-20.0 | 0.1-10.0 |
| Other Dispersants | 0.0-10.0 | 1.0-6.0 |
| Dispersant viscosity index improver(s) | 0.0-10.0 | 0.0-5.0 |
| Friction modifier(s) | 0.0-10.0 | 0.01-4.0 |
| Extreme Pressure Agent (S wt. %) | 0.0-1.05 | .035-.35 |
| Base oil(s) | Balance | Balance |
| Total | 100 | 100 |

A suitable DI package used in a finished oil composition including the copolymers herein may include the components of Table 1B below.

TABLE 1B

DI Additive Package

| Component | Wt. % (Suitable Embodiments) | Wt. % (Preferred Embodiments) |
|---|---|---|
| Silicone Functional OCP VII | 0.1 to 10 | 0.3 to 2.0 |
| Additional Dispersants | 0.0-10.0 | 1.0-6.0 |
| Antioxidants | 0.0-5.0 | 0.01-3.0 |
| Metal Detergents | 0.0-15.0 | 0.1-8.0 |
| Corrosion Inhibitor | 0.0-5.0 | 0.0-2.0 |
| Metal dihydrocarbyl dithiophosphate | 0.0-6.0 | 0.1-4.0 |
| Ash-free amine phosphate salt | 0.0-6.0 | 0.0-4.0 |
| Antifoaming agents | 0.0-5.0 | 0.001-0.15 |
| Antiwear agents | 0.0-1.0 | 0.0-0.8 |
| Pour point depressant | 0.0-5.0 | 0.01-1.5 |

The percentages of each component above represent the weight percent of each component, based upon the weight of the total final lubricating oil composition. The balance of the lubricating oil composition consists of one or more base oils. Additives used in formulating the compositions described herein may be blended into the base oil individually or in various sub-combinations. However, it may be suitable to blend all of the components concurrently using an additive concentrate (i.e., additives plus a diluent, such as a hydrocarbon solvent).

Fully formulated lubricants conventionally contain an additive package, often referred to as a dispersant/inhibitor package or DI package typically supplies certain performance and/or characteristics that are required in the formulations. Suitable DI packages are described for example in U.S. Pat. Nos. 5,204,012 and 6,034,040 for example. Among the types of additives included in the additive package may be dispersants, seal swell agents, antioxidants, foam inhibitors, lubricity agents, rust inhibitors, corrosion inhibitors, demulsifiers, viscosity index improvers, and the like. Several of these components are well known to those skilled in the art and are generally used in conventional amounts with the additives and compositions described herein.

Lubricants, combinations of components, or individual components of the present description may be suitable for use as a lubricant in various types of internal combustion engines. Suitable engine types may include, but are not limited to, heavy duty diesel, passenger car, light duty diesel, medium speed diesel, or marine engines. An internal combustion engine may be a diesel fueled engine, a gasoline fueled engine, a natural gas fueled engine, a bio-fueled engine, a mixed diesel/biofuel fueled engine, a mixed gasoline/biofuel fueled engine, an alcohol fueled engine, a mixed gasoline/alcohol fueled engine, a compressed natural gas (CNG) fueled engine, or mixtures thereof. A diesel engine may be a compression ignited engine. A gasoline engine may be a spark-ignited engine. An internal combustion engine may also be used in combination with an electrical or battery source of power. An engine so configured is commonly known as a hybrid engine. The internal combustion engine may be a 2-stroke, 4-stroke, or rotary engine. Suitable internal combustion engines include marine diesel engines (such as inland marine), aviation piston engines, low-load diesel engines, and motorcycle, automobile, locomotive, and truck engines.

The lubricating oil composition for an internal combustion engine may be suitable for any engine lubricant irrespective of the sulfur, phosphorus, or sulfated ash (ASTM D-874) content. In some approaches, the sulfur content of the engine oil lubricants herein may be about 1 weight percent or less, or about 0.8 weight percent or less, or about 0.5 weight percent or less, or about 0.3 weight percent or less, or about 0.2 weight percent or less. In one embodiment the sulfur content may be in the range of about 0.001 weight percent to about 0.5 weight percent, or about 0.01 weight percent to about 0.3 weight percent. The phosphorus content of the engine oil lubricants herein may be about 0.2 weight percent or less, or about 0.1 weight percent or less, or about 0.085 weight percent or less, or about 0.08 weight percent or less, or even about 0.06 weight percent or less, about 0.055 weight percent or less, or about 0.05 weight percent or less. In one embodiment, the phosphorus content may be about 50 ppm to about 1000 ppm, or about 325 ppm to about 850 ppm, or up to 600 ppm. The total sulfated ash content of the engine oil lubricants herein may be about 2 weight percent or less, or about 1.5 weight percent or less, or about 1.1 weight percent or less, or about 1 weight percent or less, or about 0.8 weight percent or less, or about 0.5 weight percent or less. In one embodiment the sulfated ash content may be about 0.05 weight percent to about 0.9 weight percent, or about 0.1 weight percent or about 0.2 weight percent to about 0.45 weight percent.

Further, lubricants of the present description may be suitable to meet one or more industry specification requirements such as ILSAC GF-3, GF-4, GF-5, GF-6, CK-4, FA-4, CJ-4, CI-4 Plus, CI-4, ACEA A1/B1, A2/B2, A3/B3, A3/B4, A5/B5, C1, C2, C3, C4, C5, E4/E6/E7/E9, Euro 5/6, JASO DL-1, Low SAPS, Mid SAPS, or original equipment manufacturer specifications such as Dexos™ 1, Dexos™ 2, MB-Approval 229.51/229.31, VW 502.00, 503.00/503.01, 504.00, 505.00, 506.00/506.01, 507.00, 508.00, 509.00, BMW Longlife-04, Porsche C30, Peugeot Citroën Automobiles B71 2290, B71 2296, B71 2297, B71 2300, B71 2302, B71 2312, B71 2007, B71 2008, Ford WSS-M2C153-H, WSS-M2C930-A, WSS-M2C945-A, WSS-M2C913A, WSS-M2C913-B, WSS-M2C913-C, GM 6094-M, Chrysler MS-6395, or any past or future passenger car motor oil or heavy duty diesel oil specifications not mentioned herein. In some embodiments for passenger car motor oil applications, the amount of phosphorus in the finished fluid is 1000 ppm or less or 900 ppm or less or 800 ppm or less or 600 ppm or less. In some embodiments for heavy duty diesel applications, the amount of phosphorus in the finished fluid is 1200 ppm or less or 1000 ppm or less or 900 ppm or less or 800 ppm or less.

In certain applications, the lubricants of the present disclosure may also be suitable for automatic transmission fluids, continuously variable transmission fluids, manual transmission fluids, gear oils, other fluids related to power train components, off-road fluids, power steering fluids, fluids used in wind turbines, compressors, hydraulic fluids, slideway fluids, and other industrial fluids. In certain applications, these lubricating applications may include lubrication of gearboxes, power take-off and clutch(es), rear axles, reduction gears, wet brakes, and hydraulic accessories.

EXAMPLES

The following examples are illustrative of exemplary embodiments of the disclosure. In these examples, as well as elsewhere in this application, all ratios, parts, and percentages are by weight unless otherwise indicated. It is intended that these examples are being presented for the purpose of illustration only and are not intended to limit the scope of the invention disclosed herein. The siliconization and optional amine post treatments may follow the exemplary reaction schemes shown below (reactants are only exemplary and may be any of those described throughout this disclosure):

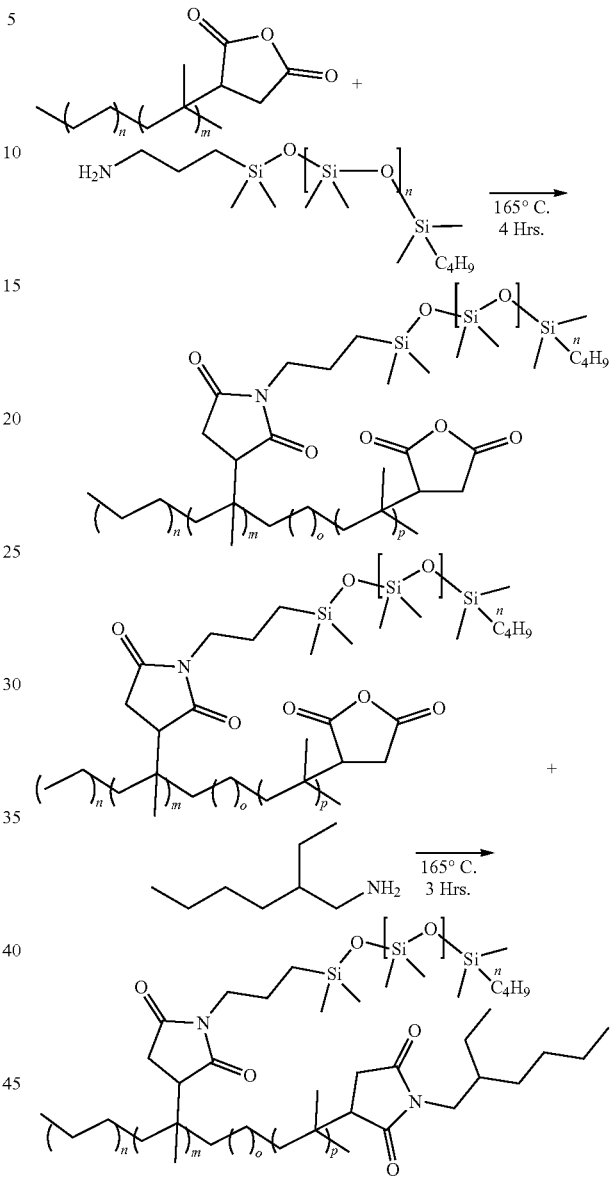

Comparative Example 1

HiTEC® 5754A was a commercially available olefin copolymer viscosity index improver from Afton Chemical Corporation used in the further Examples below. This comparative polymer was not acylated and was not functionalized with silicone. It had a number average molecular weight of about 233,000.

Example 1

An acylated ethylene-propylene copolymer having a number average molecular weight of approximately 56,000 g/mol was obtained by grafting maleic anhydride to an ethylene-propylene copolymer. The reaction stoichiometry and reaction conditions were such that allowed 11.4 molecules of maleic anhydride to be grafted onto the olefin copolymer backbone or about 0.41 carboxylic groups per 1,000 Mn of the polymer backbone (i.e. 2×11.4=22.8 carboxylic groups/56,000 Mn=0.41 carboxylic groups/1000 Mn). While this polymer was acylated, it was not functionalized with silicone.

Example 2

Another acylated ethylene-propylene copolymer having a number average molecular weight of approximately 83,000 g/mol was obtained by grafting maleic anhydride to an ethylene-propylene copolymer. The reaction stoichiometry and reaction conditions were such that allowed 11.85 molecules of maleic anhydride to be grafted onto the olefin copolymer backbone or about 0.29 carboxylic groups per 1,000 Mn of the polymer backbone (i.e. 2×11.85=23.7 carboxylic groups/83,000 Mn=0.29 carboxylic groups/1000 Mn). While this polymer was also acylated, it was not functionalized with silicone.

Example 3

A silicone functionalized acylated ethylene-propylene copolymer was prepared using the polymer of Example 1. To a 4 neck, 500 mL resin kettle equipped with a heating mantle, a pitched 3 blade overhead stirrer, a thermocouple, a nitrogen inlet, a nitrogen outlet and condenser, was added 298.8 grams of grams of 1ION oil and 35 g of the acylated polymer from Example 1. The reaction temperature was raised to about 165° C. and maintained under constant nitrogen flow. To the mixture, a monopropyl, amine terminated PDMS with an average number molecular weight of 800-1200 (5.7 g, 7.1 mmol) was added and the reaction was held for 4 hours. After 4 hours, Surfonic® L24-2 (10.5 g) was added to the reaction mixture and the reaction mixture was held at 165° C. for an additional 2 hours. The final product was filtered through a 100 mesh (140 µm) filter. The product was allowed to cool to room temperature and was tested for viscometric performance.

The resulting polymer was subject to two dissolution iterations comprising one addition of an equivalent weight of heptane, followed by precipitation with ten equivalents of acetone. The polymer was thoroughly dried of acetone and finished drying in vacuo. The grafting efficiency was characterized by changes in IR spectra and molecular weight by GPC of the polymer. The resultant polymer of this Example had a weight ratio of silicone to nitrogen of 27.55.

Example 4

Another silicone functionalized acylated ethylene-propylene copolymer was prepared using the polymer from Example 1. To a 4 neck, 500 mL resin kettle equipped with a heating mantle, a pitched 3 blade overhead stirrer, a thermocouple, a nitrogen inlet, a nitrogen outlet and condenser, was added 302 grams of grams of 110N oil and 35 g of acylated polymer from Example 1. The reaction temperature was raised to about 165° C. and maintained under constant nitrogen flow. To the mixture, 3-aminopropyltris (trimethylsiloxy) Silane (2.5 g, 7.1 mmol) was added and the reaction was held for 4 hours. After 4 hours, Surfonic® L24-2 (10.5 g) was added to the reaction mixture and the reaction mixture was held at 165° C. for an additional 2 hours. The resultant polymer of this Example had a weight ratio of silicone to nitrogen of 1.00.

Example 5

A silicone functionalized acylated ethylene-propylene copolymer was prepared using the polymer from Example 2. To a 4 neck, 500 mL resin kettle equipped with a heating mantle, a pitched 3 blade overhead stirrer, a thermocouple, a nitrogen inlet, a nitrogen outlet and condenser, was added 300.5 grams of grams of 110N oil and 35 g of the acylated polymer from Example 2. The reaction temperature was raised to about 165° C. and maintained under constant nitrogen flow. To the mixture, the monopropyl, amine terminated PDMS of Example 3 with an average number molecular weight of 800-1200 (4.0 g, 5.0 mmol) was added and the reaction was held for 4 hours. After 4 hours, Surfonic® L24-2 (10.5 g) was added to the reaction mixture and the reaction mixture was held at 165° C. for an additional 2 hours. The final product was filtered through a 100 mesh (140 µm) filter. The product was allowed to cool to room temperature and was tested for viscometric performance.

The resulting polymer was subject to two dissolution iterations comprising one addition of an equivalent weight of heptane, followed by precipitation with ten equivalents of acetone. The polymer was thoroughly dried of acetone and finished drying in vacuo. The grafting efficiency was characterized by changes in IR spectra and molecular weight by GPC of the polymer. The resultant polymer had a weight ratio of silicone to nitrogen of 27.55.

Example 6

Another silicone functionalized acylated ethylene-propylene copolymer was prepared using the polymer from Example 2 and then post treated with an amino compound. To a 4 neck, 500 mL resin kettle equipped with a heating mantle, a pitched 3 blade overhead stirrer, a thermocouple, a nitrogen inlet, a nitrogen outlet and condenser, was added 302.2 grams of grams of 110N oil and 35 g of acylated polymer from Example 2. The reaction temperature was raised to about 165° C. and maintained under constant nitrogen flow. To the mixture, a monopropyl, amine terminated PDMS with an average number molecular weight of 800-1200 (0.8 g, 1.0 mmol) was added and the reaction was held for 4 hours. After 4 hours, 2-ethyl-1-hexylamine (0.5 g, 4.0 mmol) was added to the reaction mixture and the reaction was held at 165° C. for an additional 3 hours. After 3 hours, Surfonic® L24-2 (10.5 g) was added to the reaction mixture and the reaction mixture was held at 165° C. for an additional 2 hours. The final product was filtered through a 100 mesh (140 µm) filter. The product was allowed to cool to room temperature and was tested for viscometric performance. This resultant polymer has a weight ratio of silicone to nitrogen of 4.65.

The resulting polymer was subject to two dissolution iterations comprising one addition of an equivalent weight of heptane, followed by precipitation with ten equivalents of acetone. The polymer was thoroughly dried of acetone and finished drying in vacuo. The grafting efficiency was characterized by changes in IR spectra and molecular weight by GPC of the polymer.

Example 7

Another silicone functionalized acylated ethylene-propylene copolymer was prepared using the polymer from Example 2 and then post treated with an amino compound. To a 4 neck, 500 mL resin kettle equipped with a heating mantle, a pitched 3 blade overhead stirrer, a thermocouple, a nitrogen inlet, a nitrogen outlet and condenser, was added 302.7 grams of grams of 110N oil and 35 g of the acylated polymer from Example 2. The reaction temperature was raised to about 165° C. and maintained under constant nitrogen flow. To the mixture, a monopropyl, amine terminated PDMS with an average number molecular weight of 800-1200 (0.8 g, 1.0 mmol) was added and the reaction was held for 4 hours. After 4 hours, bis-2-ethyl-1-hexylamine (1.3 g, 6.8 mmol) was added to the reaction mixture and the reaction was held at 165° C. for an additional 3 hour. After 3 hours, Surfonic® L24-2 (10.5 g) was added to the reaction mixture and the reaction mixture was held at 165° C. for an additional 2 hours. The final product was filtered through a 100 mesh (140 µm) filter. The product was allowed to cool to room temperature and was tested for viscometric performance. This polymer has a weight ratio of silicone to nitrogen of 4.08.

The resulting polymer was subject to two dissolution iterations comprising one addition of an equivalent weight of heptane, followed by precipitation with ten equivalents of acetone. The polymer was thoroughly dried of acetone and finished drying in vacuo. The grafting efficiency was characterized by changes in IR spectra and molecular weight by GPC of the polymer.

Example 8

Another silicone functionalized acylated ethylene-propylene copolymer was prepared using the polymer from Example 2 and then post treated with an amino compound. To a 4 neck, 500 mL resin kettle equipped with a heating mantle, a pitched 3 blade overhead stirrer, a thermocouple, a nitrogen inlet, a nitrogen outlet and condenser, was added 302.2 grams of grams of 110N oil and 35 g of the acylated polymer from Example 2. The reaction temperature was raised to about 165° C. and maintained under constant nitrogen flow. To the mixture, a monopropyl, amine terminated PDMS with an average number molecular weight of 800-1200 (1.6 g, 2.0 mmol) was added and the reaction was held for 4 hours. After 4 hours, bis-2-ethyl-1-hexylamine (0.7 g, 3.9 mmol) was added to the reaction mixture and the reaction was held at 165° C. for an additional 3 hours. After 3 hours, Surfonic® L24-2 (10.5 g) was added to the reaction mixture and the reaction mixture was held at 165° C. for an additional 2 hours. The final product was filtered through a 100 mesh (140 µm) filter. The product was allowed to cool to room temperature and was tested for viscometric performance. This polymer has a weight ratio of silicone to nitrogen of 8.66.

The resulting polymer was subject to two dissolution iterations comprising one addition of an equivalent weight of heptane, followed by precipitation with ten equivalents of acetone. The polymer was thoroughly dried of acetone and finished drying in vacuo. The grafting efficiency was characterized by changes in IR spectra and molecular weight by GPC of the polymer.

Example 9

Another silicone functionalized acylated ethylene-propylene copolymer was prepared using the polymer from Example 2 and then post treated with an amino compound. To a 4 neck, 500 mL resin kettle equipped with a heating mantle, a pitched 3 blade overhead stirrer, a thermocouple, a nitrogen inlet, a nitrogen outlet and condenser, was added 302.5 grams of grams of 110N oil and 35 g of the acylated polymer from Example 2. The reaction temperature was raised to about 165° C. and maintained under constant nitrogen flow. To the mixture, a monopropyl, amine terminated PDMS with an average number molecular weight of 800-1200 (1.6 g, 2.0 mmol) was added and the reaction was held for 4 hours. After 4 hours, 2-ethyl-1-hexylamine (0.4 g, 3.0 mmol) was added to the reaction mixture and the reaction was held at 165° C. for an additional 3 hours. After 3 hours, Surfonic® L24-2 (10.5 g) was added to the reaction mixture and the reaction mixture was held at 165° C. for an additional 2 hours. The final product was filtered through a 100 mesh (140 µm) filter. The product was allowed to cool to room temperature and was tested for viscometric performance. This polymer has a weight ratio of silicone to nitrogen of 8.64.

The resulting polymer was subject to two dissolution iterations comprising one addition of an equivalent weight of heptane, followed by precipitation with ten equivalents of acetone. The polymer was thoroughly dried of acetone and finished drying in vacuo. The grafting efficiency was characterized by changes in IR spectra and molecular weight by GPC of the polymer.

Example 10

Another silicone functionalized acylated ethylene-propylene copolymer was prepared using the polymer from Example 2 and then post treated with an amino compound. To a 4 neck, 500 mL resin kettle equipped with a heating mantle, a pitched 3 blade overhead stirrer, a thermocouple, a nitrogen inlet, a nitrogen outlet and condenser, was added 302 grams of grams of 110N oil and 35 g of the acylated polymer from Example 2. The reaction temperature was raised to about 165° C. and maintained under constant nitrogen flow. To the mixture, a monopropyl, amine terminated PDMS with an average number molecular weight of 800-1200 (2.1 g, 2.7 mmol) was added and the reaction was held for 4 hours. After 4 hours, 2-ethyl-1-hexylamine (0.3 g, 2.4 mmol) was added to the reaction mixture and the reaction was held at 165° C. for an additional 3 hours. After 3 hours, Surfonic® L24-2 (10.5 g) was added to the reaction mixture and the reaction mixture was held at 165° C. for an additional 2 hours. The final product was filtered through a 100 mesh (140 µm) filter. The product was allowed to cool to room temperature and was tested for viscometric performance. This polymer has a weight ratio of silicone to nitrogen of 12.23.

The resulting polymer was subject to two dissolution iterations comprising one addition of an equivalent weight of heptane, followed by precipitation with ten equivalents of acetone. The polymer was thoroughly dried of acetone and finished drying in vacuo. The grafting efficiency was characterized by changes in IR spectra and molecular weight by GPC of the polymer.

Example 11

Another silicone functionalized acylated ethylene-propylene copolymer was prepared using the polymer from Example 2 and then post treated with an amino compound. To a 4 neck, 500 mL resin kettle equipped with a heating mantle, a pitched 3 blade overhead stirrer, a thermocouple, a nitrogen inlet, a nitrogen outlet and condenser, was added 302 grams of grams of 110N oil and 35 g of the acylated polymer from Example 2. The reaction temperature was raised to about 165° C. and maintained under constant nitrogen flow. To the mixture, a monopropyl, amine terminated PDMS with an average number molecular weight of 800-1200 (2.23 g, 2.79 mmol) was added and the reaction was held for 4 hours. After 4 hours, 2-ethyl-1-hexylamine (0.3 g, 2.2 mmol) was added to the reaction mixture and the reaction was held at 165° C. for an additional 3 hours. After 3 hours, Surfonic® L24-2 (10.5 g) was added to the reaction mixture and the reaction mixture was held at 165° C. for an additional 2 hours. The final product was filtered through a 100 mesh (140 µm) filter. The product was allowed to cool to room temperature and was tested for viscometric performance. This polymer has a weight ratio of silicone to nitrogen of 12.64.

The resulting polymer was subject to two dissolution iterations comprising one addition of an equivalent weight of heptane, followed by precipitation with ten equivalents of acetone. The polymer was thoroughly dried of acetone and finished drying in vacuo. The grafting efficiency was characterized by changes in IR spectra and molecular weight by GPC of the polymer.

Example 12

Another silicone functionalized acylated ethylene-propylene copolymer was prepared using the polymer from Example 2 and then post treated with an amino compound. To a 4 neck, 500 mL resin kettle equipped with a heating mantle, a pitched 3 blade overhead stirrer, a thermocouple, a nitrogen inlet, a nitrogen outlet and condenser, was added 301.3 grams of grams of 110N oil and 35 g of the acylated polymer from Example 2. The reaction temperature was raised to about 165° C. and maintained under constant nitrogen flow. To the mixture, a monopropyl, amine terminated PDMS with an average number molecular weight of 800-1200 (3.0 g, 2.8 mmol) was added and the reaction was held for 4 hours. After 4 hours, 2-ethyl-1-hexylamine (0.2 g, 1.2 mmol) was added to the reaction mixture and the reaction was held at 165° C. for an additional 3 hours. After 3 hours, Surfonic® L24-2 (10.5 g) was added to the reaction mixture and the reaction mixture was held at 165° C. for an additional 2 hours. The final product was filtered through a 100 mesh (140 µm) filter. The product was allowed to cool to room temperature and was tested for viscometric performance. This polymer has a weight ratio of silicone to nitrogen of 18.37.

The resulting polymer was subject to two dissolution iterations comprising one addition of an equivalent weight of heptane, followed by precipitation with ten equivalents of acetone. The polymer was thoroughly dried of acetone and finished drying in vacuo. The grafting efficiency was characterized by changes in IR spectra and molecular weight by GPC of the polymer.

Example 13

The non-silicone functionalized viscosity index improver from Comparative Example 1 and the silicone functionalized viscosity index improvers from Examples 3 to 12 were added to a finished oil formulation and tested for viscometric performance. The viscosity index copolymers are summarized in Table 3A and the lubricant compositions evaluated are shown in Table 3B. Each lubricant included a DI additive package having about 4.5% dispersant, about 0.5% diluent oil, about 0.006 defoamer, about 1.55% detergent, about 1.2% antioxidant, about 1.1% anti-wear agent, about 0.5% friction modifier, about 0.2% pour point depressant. Each fluid also included a base oil of 4 and 6 cSt group II base oil mix to meet SAE300 5W-30 viscosity grades.

TABLE 3A

| | VII Polymer | | | | | | | | | |
|---|---|---|---|---|---|---|---|---|---|---|
| | 3 | 5 | 6 | 7 | 8 | 9 | 10 | 11 | 12 | CE 1 |
| OPC Backbone (Mn) | 56,000 | 83,000 | 83,000 | 83,000 | 83,000 | 83,000 | 83,000 | 83,000 | 83,000 | 233,000 |
| Acylated | y | y | y | y | y | y | y | y | y | N |
| Silicone Reactant (g) | 5.7 | 4.0 | 0.8 | 0.8 | 1.6 | 1.6 | 2.1 | 2.2 | 2.9 | — |
| Alkylamine reactant (g) | — | — | 0.5 | 1.3 | 0.7 | 0.4 | 0.3 | 0.3 | 0.2 | — |
| Si to N | 27.55 | 1.00 | 4.65 | 4.08 | 8.66 | 8.97 | 12.23 | 12.78 | 18.18 | — |

TABLE 3B

| | Lubricating Compositions | | | | | | | | | |
|---|---|---|---|---|---|---|---|---|---|---|
| Example | 3 | 5 | 6 | 7 | 8 | 9 | 10 | 11 | 12 | CE 1 |
| VII Treat Rate (%) | 6.29 | 6.51 | 7.92 | 6.95 | 7.09 | 7.56 | 7.20 | 6.79 | 6.40 | |
| Silicone (ppm) | 329.9 | 238.9 | 68.9 | 52.9 | 106.5 | 113.3 | 145.2 | 139.9 | 175.9 | — |
| DI Additive Package (%) | 9.5 | 9.5 | 9.5 | 9.5 | 9.5 | 9.5 | 9.5 | 9.5 | 9.5 | 9.5 |
| Base Oil (%) | 84.21 | 83.99 | 82.58 | 83.55 | 83.41 | 82.94 | 83.30 | 83.71 | 84.10 | |

The finished oil formulations were prepared using proportional base oil ratios to assess viscometric contributions of the invention compositions.

Each of the formulations of Tables 3A-3B was tested for cold weather performance (CCS) according to the method of ASTM D5293 at −30° C., kinematic viscosity at 100° C. and 40° C., Low-Temperature Pumping Viscosity at 35° C. (MRV-35), high temperature high shear viscosity (TBS) at 150° C., and low temperature high shear viscosity performed at 100° C. (MRV and low/high temperature TBS all according to ASTM-D6616). Viscosity index was measured according to ASTM D2270. Thickening power was calculated by dissolving polymers to 1 weight percent concentration in a 5 cSt reference oil and calculating the kinematic viscosity contribution of the polymer measured at 100° C. Results are provided in Table 4 below.

TABLE 5

| Polymer | TFF Friction Coefficient |
| --- | --- |
| Example 3 | 0.048 |
| Example 5 | 0.067 |
| Example 6 | 0.047 |
| Example 7 | 0.048 |
| Example 8 | 0.049 |
| Example 9 | 0.045 |
| Example 10 | 0.042 |
| Example 11 | 0.044 |
| Example 12 | 0.043 |
| Comparative Example 1 | 0.064 |

TABLE 4

Viscometric Properties

| Example | 3 | 5 | 6 | 7 | 8 | 9 | 10 | 11 | 12 | CE 1 |
| --- | --- | --- | --- | --- | --- | --- | --- | --- | --- | --- |
| KV100° C. (cSt) | 11.02 | 11.09 | 10.98 | 11.06 | 10.96 | 10.92 | 10.99 | 11.01 | 11.11 | 11.02 |
| KV40° C. (cSt) | 69.39 | 69.54 | 68.25 | 67.49 | 67.92 | 68.1 | 68.23 | 67.52 | 67.95 | 67.88 |
| CCS-30 (cP) | 6661 | 6789 | 6954 | 6723 | 6734 | 6901 | 6833 | 6184 | 6096 | 7384 |
| MRV-35 (cP) | 32000 | 30700 | 31400 | 30100 | 30700 | 30300 | 31700 | 28500 | 29300 | 28800 |
| TBS 150° C. (cP) | 2.85 | 2.93 | 3.13 | 2.99 | 3.01 | 3.1 | 3.04 | 2.98 | 2.89 | 3.25 |
| TBS 100° C. (cP) | 6.46 | 6.64 | 6.99 | 6.51 | 6.72 | 6.82 | 6.76 | 6.51 | 6.4 | 7.57 |
| Viscosity Index | 150 | 151 | 152 | 156 | 153 | 151 | 152 | 135 | 156 | 154 |
| Thickening Power | 6.25 | 5.76 | 4.56 | 4.86 | 5.31 | 5.34 | 4.52 | 5.98 | 7.14 | 5.50 |

In general, the cold cranking temperature performance (CCS) was improved when compared to the non-silicone functionalized polymer used in comparative example 1. Improvement in the cold cranking temperature performance ranged from about 8 to about 10 percent. In particular, example 3, showed good overall performance—low CCS and good TBS which meets SAE J300 criteria. It shows that using the inventive polymer can effectively make a failed 5W30 formulation to an improved 5W30 formulation by just changing the viscosity index improver. An additional feature of this polymer, is its ability in some instances to increase thickening efficiency, and as shown in the further Examples below, in other instances to provide the ability to help improve LSPI.

Example 14

The formulations of Tables 3A-3B were further evaluated for thin film friction (TFF) using a mini-traction machine (MTM from PCS instruments) that evaluated the thin-film lubrication regime friction coefficients. These friction coefficients were measured at 130° C. with an applied load of 50N between an ANSI 52100 steel disk and an ANSI 52100 steel ball as oil was being pulled through the contact zone at an entrainment speed of 500 mm/s. A slide-to-roll ratio of 50% between the ball and disk was maintained during the measurements. Results are provided in Table 5.

Comparative Example 2

A non-silicone functionalized viscosity index improver (35 ssi OCP) was prepared by methods known in the art as described in Comparative Example 1. It was dissolved in a 4 cSt group II basestock at 7.5 weight percent solids.

Example 15

The polymer of Comparative Example 2 and two different amounts of the silicone functionalized polymer of Example 11 were formulated into lubricants as described below and as shown in Table 6. The lubricants were evaluated for viscometric performance based on the testing described in Example 13 and further evaluated for low-speed pre-ignition performance according to sequence IX Testing as known in the art.

For these evaluations, each lubricant included the composition of Table 6. The DI additive package in the final fluids included about 3.6% dispersant, about 1.9% detergent, about 1.1% anti-wear additives, about 1.6% antioxidants, about 0.5% antifoam and diluent additives, 0.14% friction modifiers, and about 0.2% of pour point dispersants.

TABLE 6

Lubricant Compositions

|  | Comparative Lubricant A | Inventive Lubricant A | Inventive Lubricant B |
| --- | --- | --- | --- |
| VII | CE2 | Example 11 | Example 11 |
| VII (wt. %) | 8.8 | 6.6 | 0.66 |

TABLE 6-continued

Lubricant Compositions

| | Comparative Lubricant A | Inventive Lubricant A | Inventive Lubricant B |
|---|---|---|---|
| Second VII | — | — | CE2 |
| Second VII (wt. %) | — | — | 7.9 |
| DI Package Additive (wt. %) | 9.0 | 9.0 | 9.0 |
| Group II base oil (%) | 50.5 | 52.7 | 50.7 |
| Group III base oil (%) | 31.7 | 31.7 | 31.7 |
| Silicone (ppm) | 5* | 181 | 10 |

*Silicone provided from anti-foam or defoamer in comparative lubricant. Inventive Lubricant A and Inventive Lubricant B did not include defoamer.

Low-speed pre-ignition sequence IX testing was performed on the finished lubricants of Table 6 where the pass/fail parameter based on the average number of LSPI events (in four total iterations) was 5 events and the pass/fail parameter based on the maximum number of events per iteration was 8 to satisfy the API SN Plus or ILSAC GF-6 limits. As shown in Table 7 and 8 below, the comparative polymer resulted in lubricant that failed the LSPI testing while the polymer of Example 11 in amounts to provide 10 to 181 ppm in a finished lubricant passed the LSP1 limits and also had improved viscometrics at the same time.

TABLE 7

Viscometrics

| | Comparative Lubricant A | Inventive Lubricant A | Inventive Lubricant B |
|---|---|---|---|
| KV100° C. (cSt) | 11.08 | 11.59 | 10.97 |
| KV40° C. (cSt) | 66.63 | 70.87 | 64.74 |
| VI | 159 | 158 | 162 |
| CCS @ 30° C. (cP) | 5899 | 5073 | 5081 |
| HTHS (TBS) (cP) | 3.19 | 2.83 | 3.08 |

TABLE 8

LSPI Evaluation

| | Comparative Lubricant A | Inventive Lubricant A | Inventive Lubricant B |
|---|---|---|---|
| Iteration A | 8 | 3 | 2 |
| Iteration B | 2 | 5 | 3 |
| Iteration C | 3 | 6 | 5 |
| Iteration D | 9 | 5 | 4 |
| Number of max events per iteration (8 Max) | 9 | 6 | 5 |
| Avg number of events for four iterations (5 Max) after severity adjustment | 6.12 | 3.68 | 3.57 |

It is noted that, as used in this specification and the appended claims, the singular forms "a," "an," and "the," include plural referents unless expressly and unequivocally limited to one referent. Thus, for example, reference to "an antioxidant" includes two or more different antioxidants. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is to be understood that each component, compound, substituent or parameter disclosed herein is to be interpreted as being disclosed for use alone or in combination with one or more of each and every other component, compound, substituent or parameter disclosed herein.

It is further understood that each range disclosed herein is to be interpreted as a disclosure of each specific value within the disclosed range that has the same number of significant digits. Thus, for example, a range from 1 to 4 is to be interpreted as an express disclosure of the values 1, 2, 3 and 4 as well as any range of such values.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range. That is, it is also further understood that any range between the endpoint values within the broad range is also discussed herein. Thus, a range from 1 to 4 also means a range from 1 to 3, 1 to 2, 2 to 4, 2 to 3, and so forth.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

The following examples are illustrative, but not limiting, of the methods and compositions of the present disclosure. Other suitable modifications and adaptations of the variety of conditions and parameters normally encountered in the field, and which are obvious to those skilled in the art, are within the spirit and scope of the disclosure. All patents and publications cited herein are fully incorporated by reference herein in their entirety. Examples 1-6 exemplify different lubricating compositions comprising viscosity index improvers comprising ethylene units and propylene units reacted to macro monomer alcohols and processes for producing them

What is claimed is:

1. A multi-functional olefin copolymer viscosity index improver comprising an acylated olefin copolymer with aminosilane or aminosiloxane pendant groups, the acylated olefin copolymer including an olefin copolymer backbone with grafted acylating moieties thereon linking the aminosilane or aminosiloxane pendant groups to the olefin copolymer backbone.

2. The multi-functional olefin copolymer viscosity index improver of claim 1, wherein the aminosilane or aminosiloxane pendant groups are derived from aminoalkyl silanes, aminoalkyl siloxanes, aminoalkyl polysiloxanes, aminoaryl silanes, aminoaryl siloxanes, aminoarl oxy silanes, and combinations thereof.

3. The multi-functional olefin copolymer viscosity index improver of claim 1, wherein the multi-functional olefin copolymer viscosity index improver is the reaction product of the acylated olefin copolymer and the aminosilane or aminosiloxane selected from aminoalkyl silanes, aminoalkyl silixones, aminoalkyl polysiloxanes, aminoaryl silanes, aminoaryl siloxanes, aminoarl oxy silanes, and combinations thereof.

4. The multi-functional olefin copolymer viscosity index improver of claim 3, wherein the reaction product is further reacted with an amine selected from alkylamines, alkylpolyamines, or combinations thereof.

5. The multi-functional olefin copolymer viscosity index improver of claim 1, wherein the grafted acylating moieties are grafted dicarboxylic moieties.

6. The multi-functional olefin copolymer viscosity index improver of claim 1, wherein the olefin copolymer backbone has a number average molecular weight of about 10,000 to about 200,000.

7. The multi-functional olefin copolymer viscosity index improver of claim 1, wherein the olefin copolymer backbone is derived from a copolymer of ethylene and one or more C3 to C18 α-olefins.

8. The multi-functional olefin copolymer viscosity index improver of claim 1, wherein the acylated olefin copolymer has about 0.1 to about 0.8 carboxylic groups per 1,000 number average molecular weight units of the acylated olefin copolymer.

9. The multi-functional olefin copolymer viscosity index improver of claim 8, wherein the acylated olefin copolymer is derived from a copolymer of ethylene and one or more C3 to C18 α-olefins and a grafted ethylenically unsaturated acylating agent having at least one ethylenic bond and at least one carboxylic acid group or anhydride group thereof or a polar group that is convertible into a carboxyl group reacted with the olefin copolymer and wherein the acylated olefin copolymer includes about 15 to about 80 mol % ethylene and about 85 to about 20 mol % C3 to C18 α-olefins.

10. The multi-functional olefin copolymer viscosity index improver of claim 9, wherein the ethylenically unsaturated acylating agent is selected from acrylic acid, methacrylate acid, cinnamic acid, crotonic acid, maleic acid, fumaric acid or anhydride derivatives thereof.

11. A lubricating oil composition comprising a major amount of a base oil and a minor amount of an acylated olefin copolymer viscosity index improver having aminosilane or aminosiloxane pendant groups, wherein the acylated olefin copolymer has an olefin copolymer backbone with grafted acyl moieties thereon linking the aminosilane or aminosiloxane pendant group to the olefin copolymer backbone, the acylated olefin copolymer viscosity index improver in an amount to provide about 5 to about 200 ppm of silicone to the lubricating oil composition.

12. The lubricating oil composition of claim 11, wherein the aminosilane or aminosiloxane pendant groups are derived from aminoalkyl silanes, aminoalkyl silixones, aminoalkyl polysiloxanes, aminoaryl silanes, aminoaryl siloxanes, aminoarl oxy silanes, and combinations thereof.

13. The lubricating oil composition of claim 11, wherein the multi-functional olefin copolymer viscosity index improver is the reaction product of the acylated olefin copolymer and the aminosilane or aminosiloxane selected from aminoalkyl silanes, aminoalkyl silixones, aminoalkyl polysiloxanes, aminoaryl silanes, aminoaryl siloxanes, aminoarl oxy silanes, and combinations thereof.

14. The lubricating oil composition of claim 13, wherein the reaction product is further reacted with an amine selected from alkylamines, alkylpolyamines, or combinations thereof.

15. The lubricating oil composition of claim 11, wherein the grafted acyl moieties are grafted dicarboxylic moieties.

16. The lubricating oil composition of claim 11, wherein the olefin copolymer backbone has a number average molecular weight of about 10,000 to about 200,000.

17. The lubricating oil composition of claim 11, wherein the olefin copolymer backbone is derived from a copolymer of ethylene and one or more C3 to C18 α-olefins.

18. The lubricating oil composition of claim 11, wherein the acylated olefin copolymer has about 0.1 to about 0.8 carboxylic group per 1,000 number average molecular weight units of the acylated olefin copolymer.

19. The lubricating oil composition of claim 18, wherein the acylated olefin copolymer is derived from a copolymer of ethylene and one or more C3 to C18 α-olefins and a grafted ethylenically unsaturated acylating agent material having at least one ethylenic bond and at least one carboxylic acid group or anhydride group thereof or a polar group that is convertible into a carboxyl group reacted with the olefin copolymer.

20. The lubricating oil composition of claim 19, wherein the ethylenically unsaturated acylating agent material is selected from acrylic acid, methacrylate acid, cinnamic acid, crotonic acid, maleic acid, fumaric acid or anhydride derivatives thereof.

* * * * *